United States Patent

[11] 3,586,176

| [72] | Inventors | Michael I. Rackman<br>Brooklyn, N.Y.;<br>George C. Devol, 990 Ridgefield Road,<br>Wilton, Conn. 06897 |
|---|---|---|
| [21] | Appl. No. | 814,788 |
| [22] | Filed | Apr. 9, 1969 |
| [45] | Patented | June 22, 1971 |
| [73] | Assignees | Said Devol, by said Rackman;<br>Paul S. Martin<br>Flushing, N.Y., by said Rackman |

[54] PALLETIZING APPARATUS
16 Claims, 11 Drawing Figs.

[52] U.S. Cl. .................................................. 214/6,
214/1
[51] Int. Cl. ..................................................... B65g 57/20
[50] Field of Search ........................................... 214/6, 6 P,
1 B

[56] References Cited
UNITED STATES PATENTS

| 2,988,237 | 6/1961 | Devol, Jr. ..................... | 214/11 |
| 3,279,624 | 10/1966 | Devol ........................... | 214/1 (B3) |
| 3,306,442 | 2/1967 | Devol ........................... | 209/121 |
| 3,351,219 | 11/1967 | Ruderfer ...................... | 214/16.4 (2) |
| 3,436,968 | 4/1969 | Unger et al. ................. | 214/6 X |
| 3,455,468 | 7/1969 | Saul ............................. | 214/16.4 (2) |

*Primary Examiner*—Gerald M. Forlenza
*Assistant Examiner*—Robert J. Spar
*Attorney*—Paul S. Martin ABSTRACT: A program-controlled article-tranfer robot is adapted to load a pallet automatically with cartons of various sizes without dependence on a lengthy control program identifying the position of every carton in each of the rows and at each of the levels of the load. At the start, the robot is taught to load only a single carton on the pallet, ordinarily at one corner and at the surface of the pallet. When the robot goes through its routine for loading the first carton, it picks up a carton at a supply point, and it measures the dimensions of the carton. Subsequent cartons are loaded in successive rows and in successive levels automatically, in dependence on the first-carton loading coordinates, on the carton measurements, on the pallet size, and on the height limit of the load. The control apparatus prevents any projection of cartons outside the pallet outline and it also limits projection of cartons at upper levels beyond the next-lower level to within limits to insure stability.

The procedure is also operable to create a complete program automatically, so that subsequent robot operations can load and unload pallets under program control.

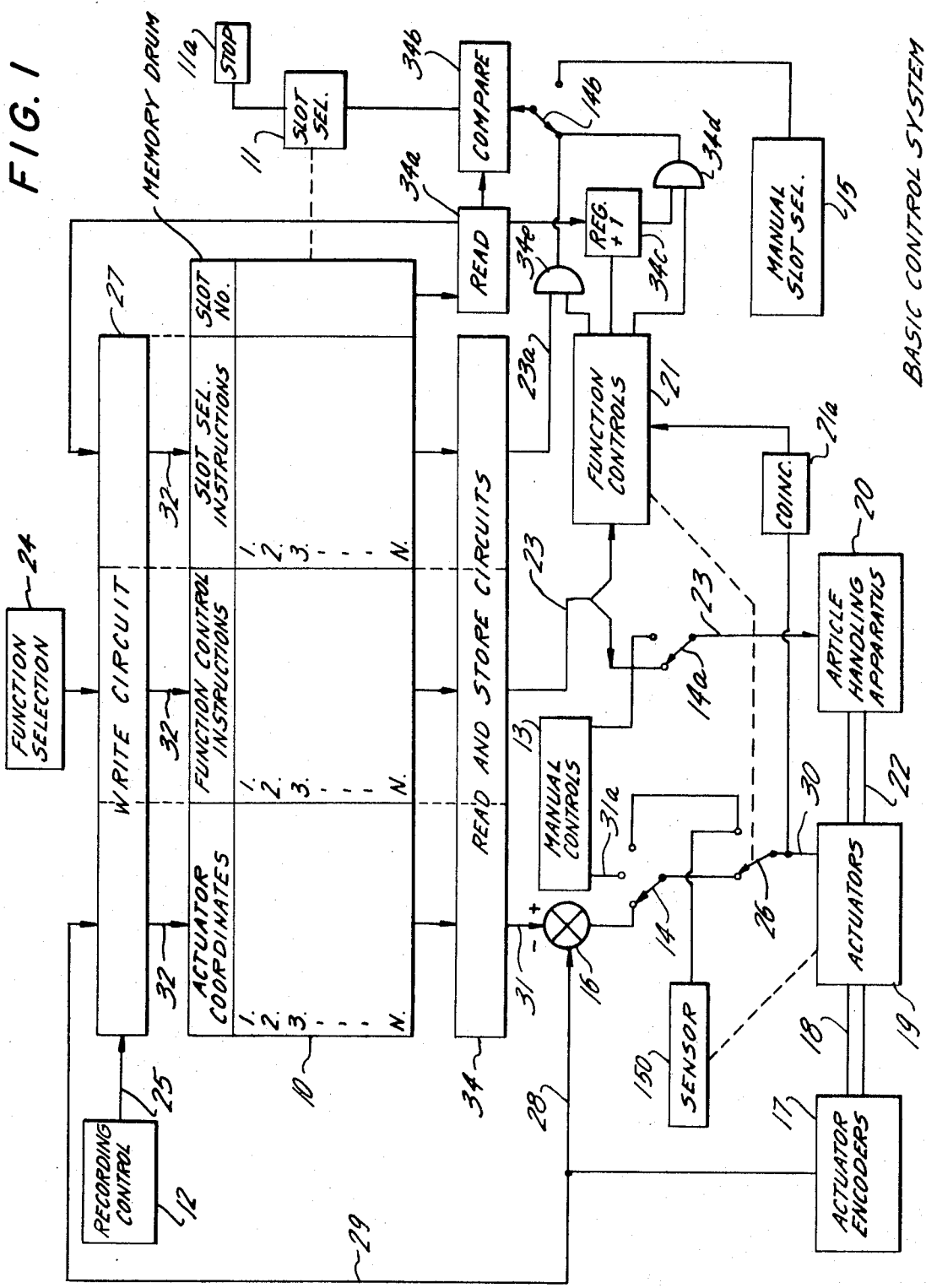

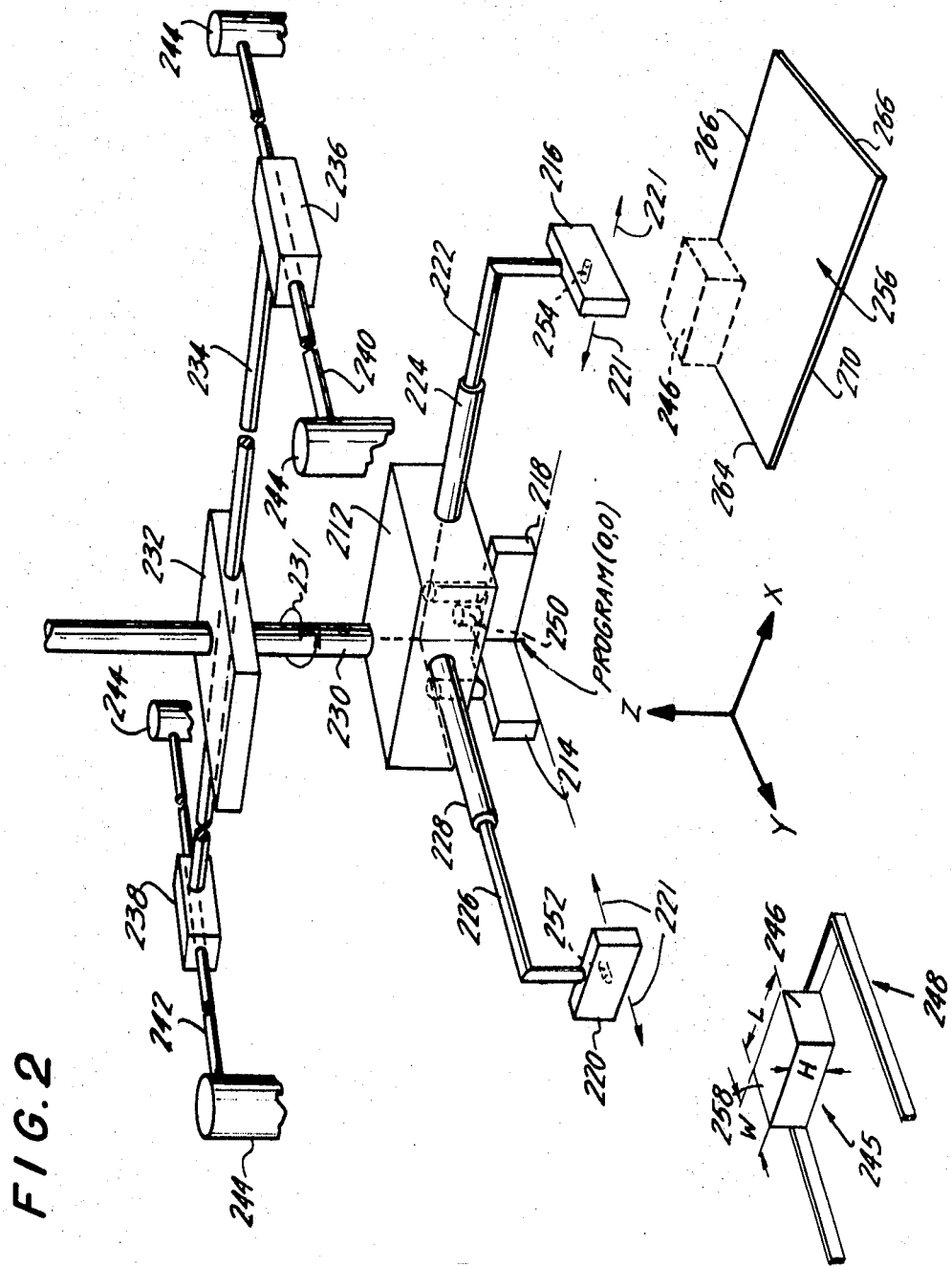

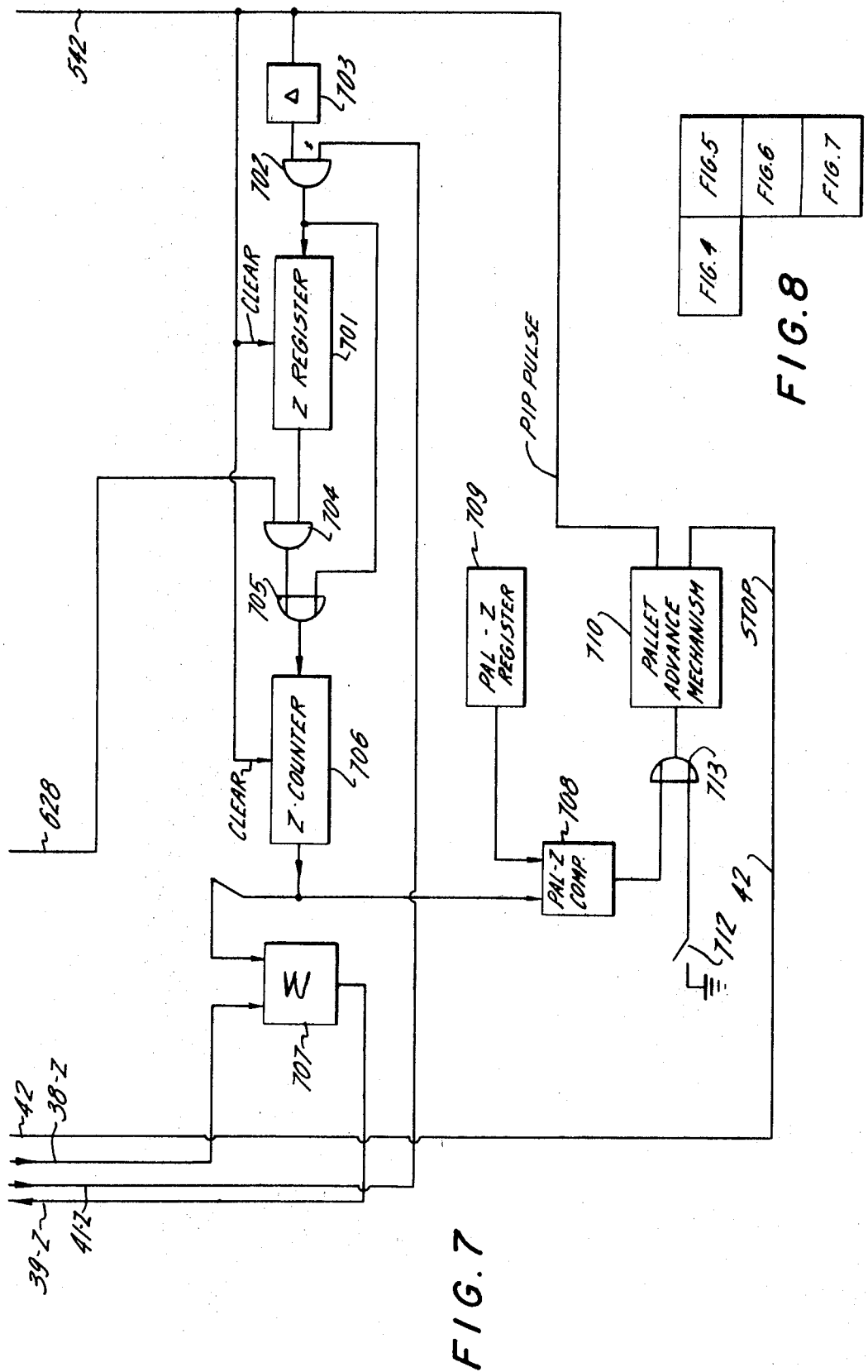

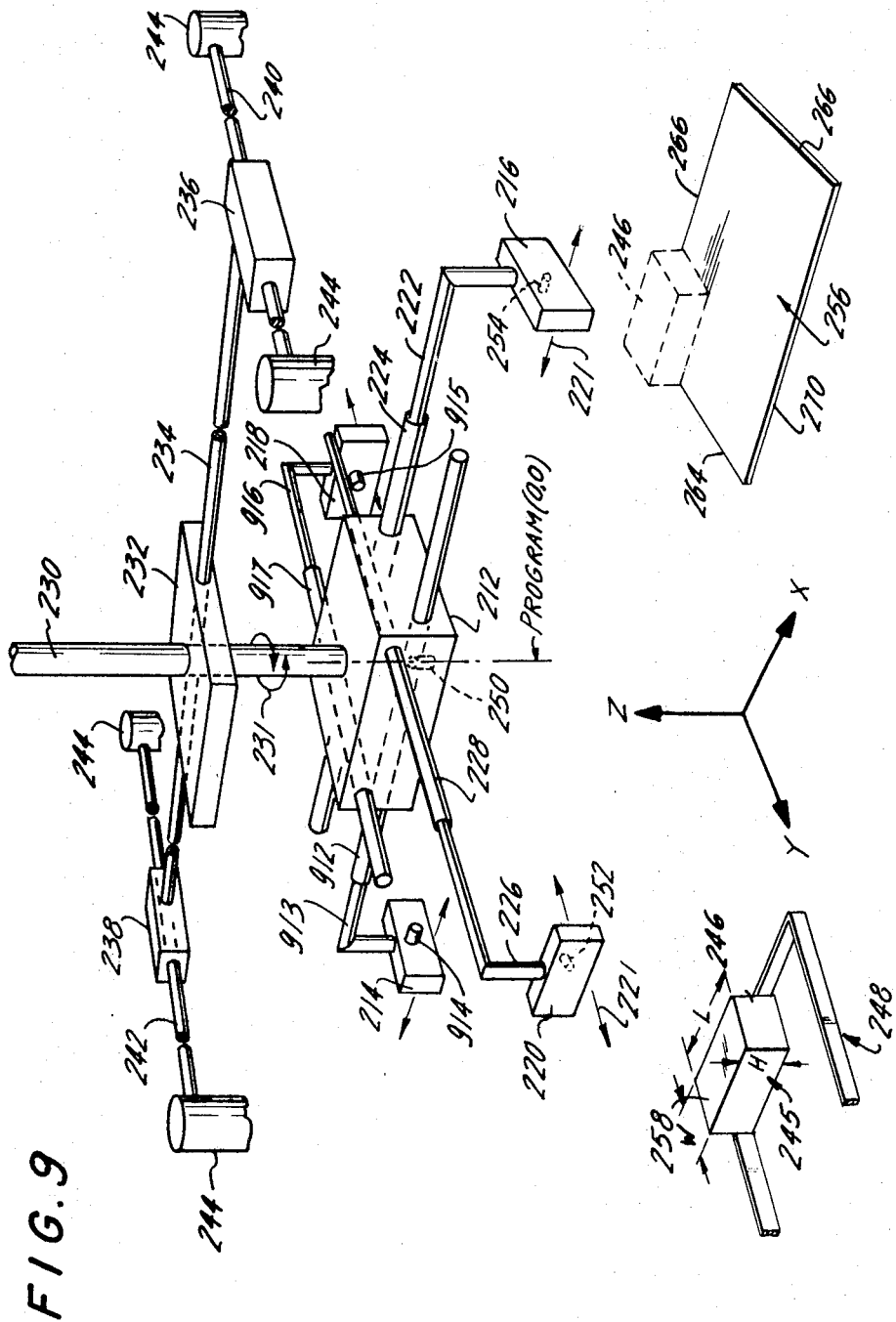

PALLETIZING APPARATUS

PALLETIZING APPARATUS

This invention relates generally to the field of article handling apparatus, and more particularly to automatic loading of a pallet with cartons or the like.

Automatic article handling equipments (robots) are presently available which can be programmed to pickup an object at a starting location, transfer it to a discharge point and deposit it in a predetermined orientation. Equipment of this kind is exemplified by U.S. Pat. Nos. 2,988,237, 3,306,442, 3,306,471, 3,251,483 and 3,279,624. As taught in U.S. Pat. No. 3,306,471, such a robot has the capability of repeating a preprogrammed transfer routine any number of times, and at the end of each such routine choosing a new discharge point in accordance with special recorded instructions for each carton location. Such a program is time-consuming to create. Different programs are ordinarily needed for cartons of different sizes.

It is a general object of this invention to provide automatic equipment for loading cartons of various dimensions on a pallet of any size, to form a level of successive rows, and successive levels, without requiring program instructions for each carton location.

Another object of the invention is to provide equipment for limiting the lengths of such rows and the number of rows in any level so that the cartons do not extend beyond the boundaries of the pallet. A related object is to provide equipment for automatic pallet loading that allows overhang of a carton beyond its next lower level in either direction, but not so far as to produce instability.

Another object of the invention is to provide equipment which limits the height of the layers of cartons on the pallet to a predetermined maximum.

Another object of the invention is to provide for the automatic removal of a fully loaded pallet, and for replacing it with a fresh pallet for the continuation of the loading operation.

Another object of the invention is to provide similar automatic equipment for the unloading of pallets.

For loading a pallet, the robot is programmed simply to load a single carton at an initial location on the pallet. The robot is also programmed to measure the dimensions of the cartons being loaded on any given pallet. To load successive cartons on the pallet, the basic robot routine is continuously repeated but the programmed routine of the first carton-depositing operation is progressively incremented in accordance with the measured dimensions. Thus, a minimum of manually controlled program recording is required. The same basic routine is executed for each carton. Cartons of various dimensions can be loaded on various pallets with no change in elemental recorded program because in every case the program instructions are incremented in accordance with the dimensions of the cartons being handled. Overloading in each of the X-, Y- and Z- directions is prevented by incrementing a respective count for the direction by the corresponding dimension of the carton being operated upon, and comparing the increasing count with a maximum allowable value. There are two main criteria for the allowable maximum: (1) the outline of the pallet; and (2) the outline of each layer of cartons that supports the new layer being formed. No projection of a carton beyond the pallet outline is permitted. A carton being loaded on a supporting layer of cartons is permitted to project to a limited extent, but not enough to cause instability.

Once the loading instructions are determined for each carton on the pallet, they can be recorded, and the sequence of instructions can be used in the automatic unloading of the pallet.

In the illustrative embodiments of the invention below, an article-transfer robot is described that is capable of straight-line article-transfer motions along rectangular coordinates, directed parallel to the length, width and height of the pallet load. This form of robot is used for illustrative purposes, for avoiding complications in the description and for easier understanding of the invention. Some commercial forms of article-transfer robots are known having one or more arcuate motions of an article-transfer arm. Those robots can use the control portion of the herein disclosed apparatus through the use of suitable rectangular-to-polar motion-control apparatus. See, for example, the pending application Ser. No. 748,703, filed July 30, 1968 by G.C. Devol et al. entitled Work Head With Automatic Motions Controls where there is described a robot having a system of rectangular-coordinate control for two arcuate motions of an article-transfer arm. That application describes loading a pallet with cartons according to rectangular-coordinate instructions, and it includes means for incrementing the program-recorded coordinates of a first carton in a row for loading additional cartons in that row.

A further characteristic of the illustrative apparatus described below is its use of absolute coordinates to identify the end-point of each motion. It will be recognized that features of the invention also apply to other robots, as those in which the instructions for each new end-point of a motion is based on digital increments of motion, as a displacement from each just-completed transfer operation.

Further objects, features and advantages of the invention will become apparent upon consideration of the following detailed description in conjunction with the drawing, in which:

FIG. 1 depicts symbolically a basic system of control for an article-handling robot;

FIG. 2 is a simplified perspective view of a first illustrative article-handling apparatus, omitting its control circuit and actuators;

FIGS. 3A and 3B depict the odd-level and even-level pallet loading patterns, respectively, produced by the illustrative embodiment of FIGS. 4—7;

Figures 3A, 3B:
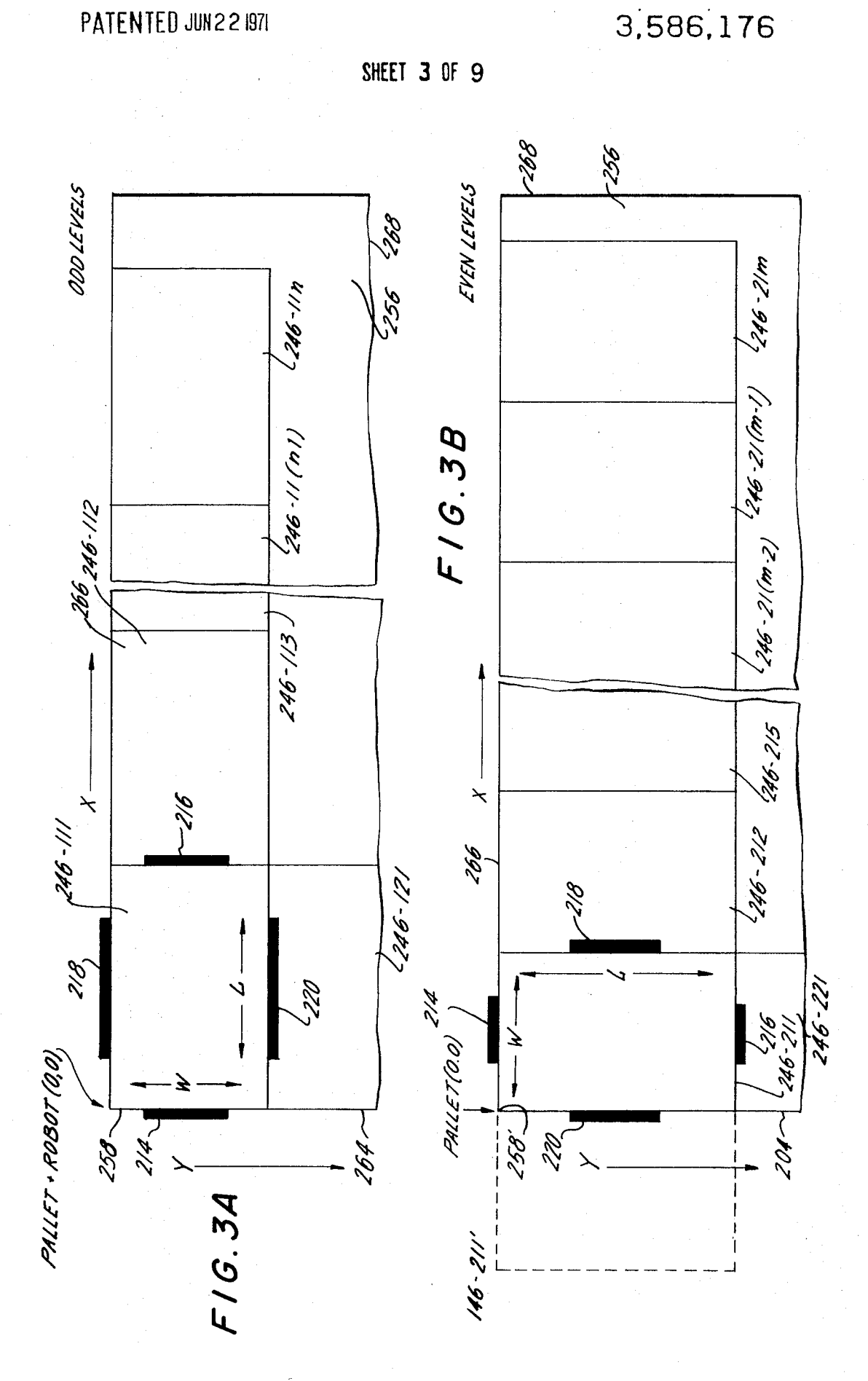
Figure 4:
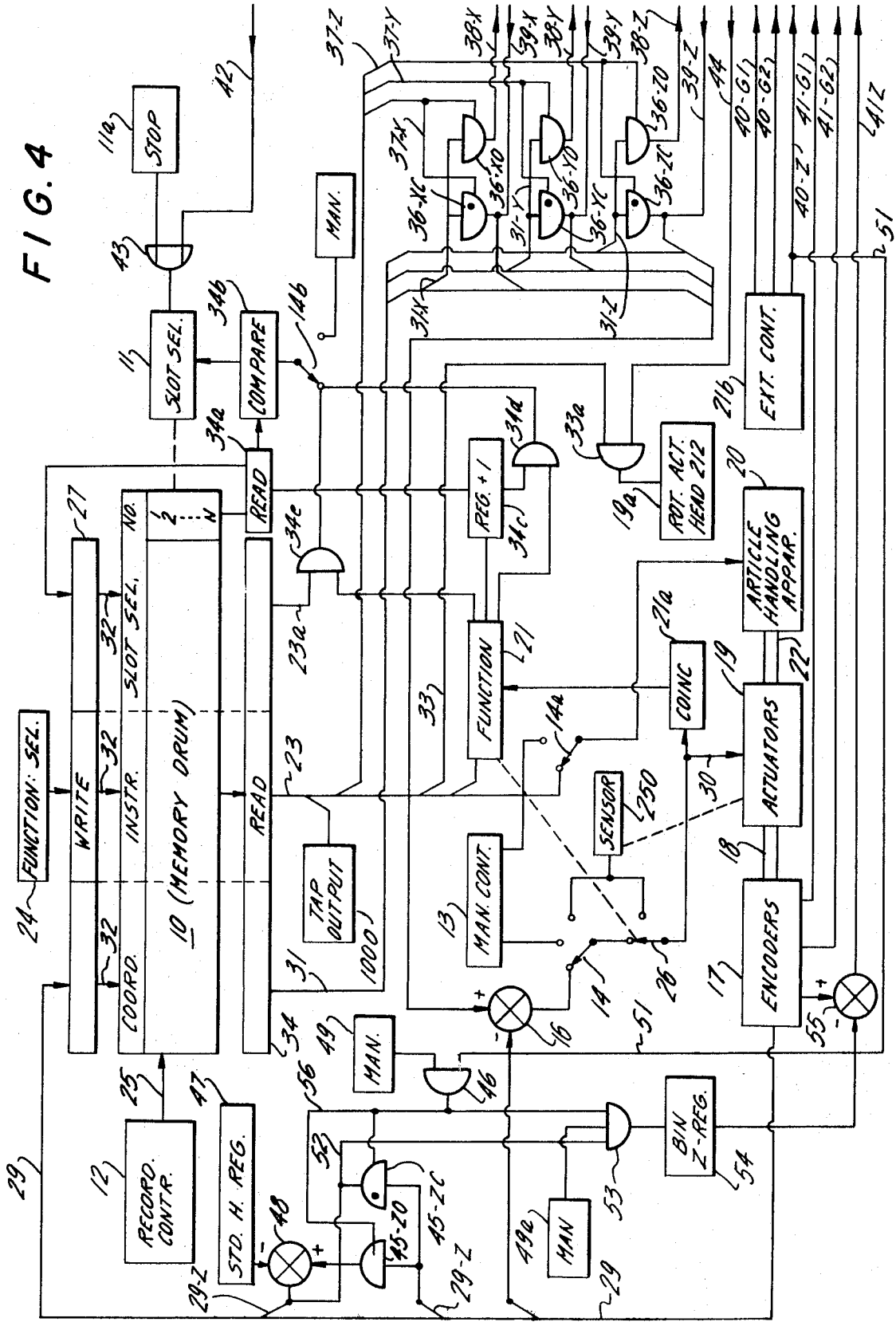
FIG. 4 is a diagram of the control apparatus of a robot similar to FIG. 1, but FIG. 4 depicts a first illustrative modification of the control system of FIG. 1 for achieving important features of the invention.
Figure 5:
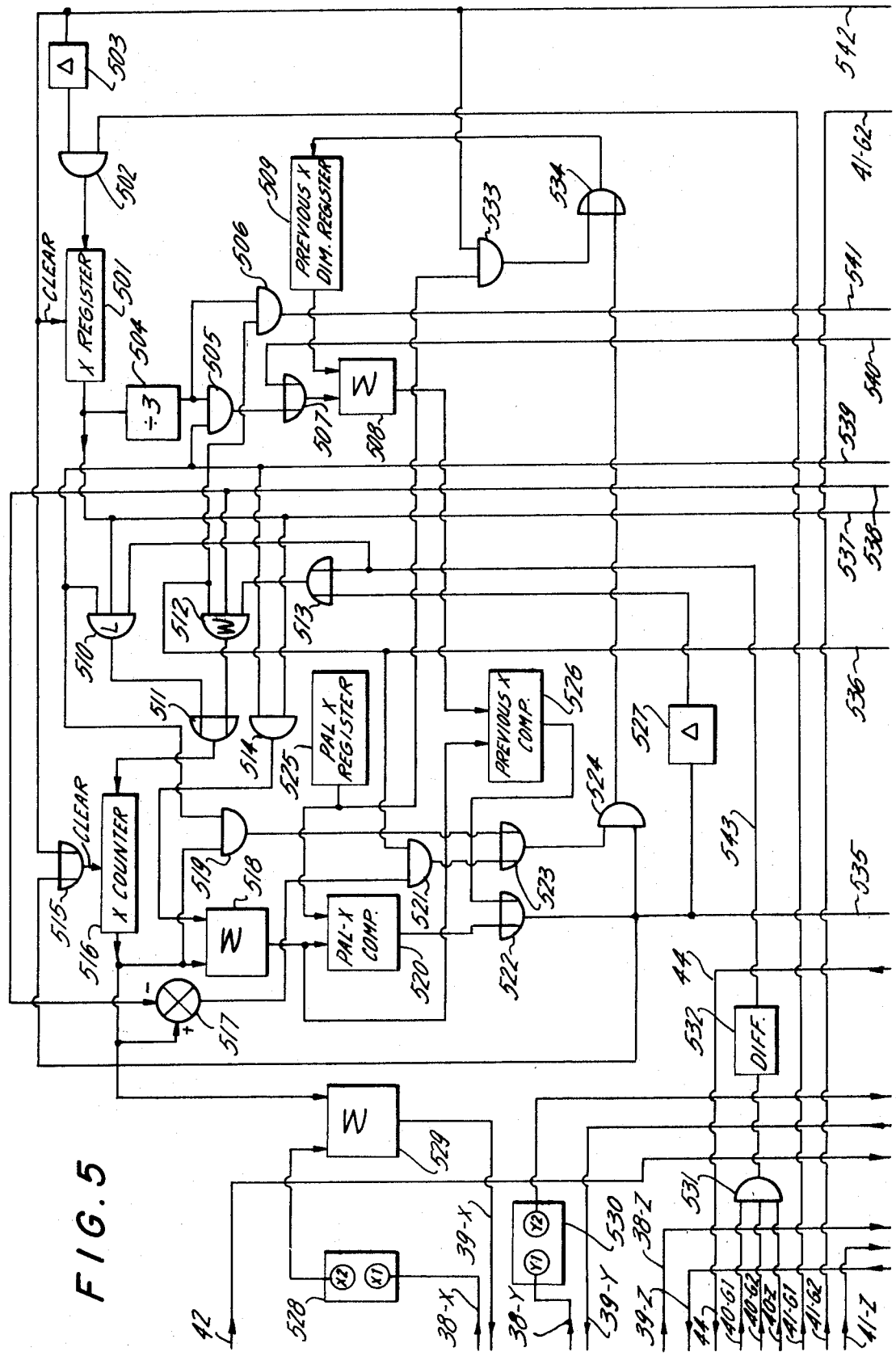
Figure 6:
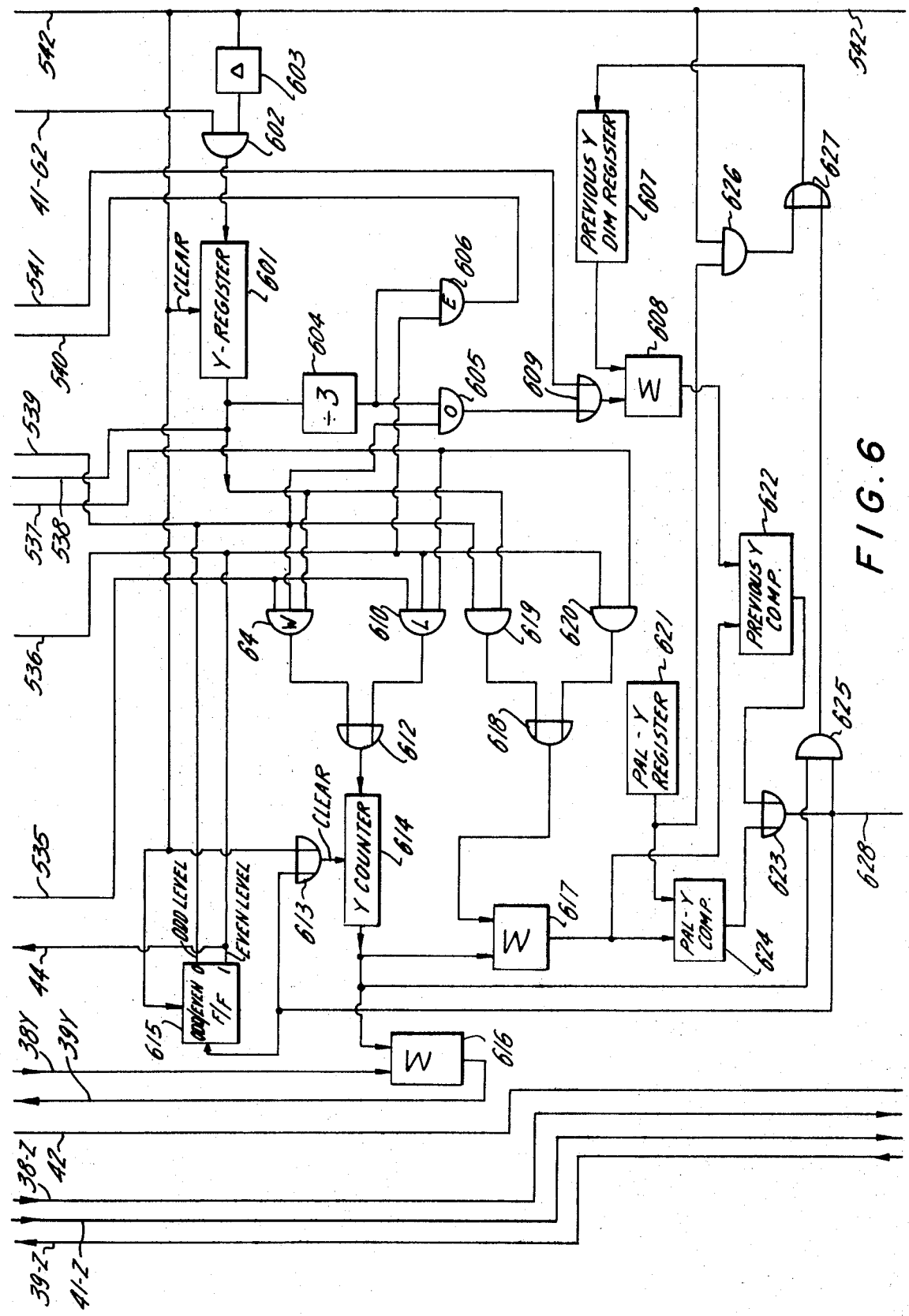

FIGS. 5—7 depict an illustrative control circuit that forms part of the apparatus of FIG. 4 to control the loading of cartons on a pallet by the article-handling apparatus of FIG. 2 in accordance with the patterns of FIGS. 3A and 3B.

Figure 10:
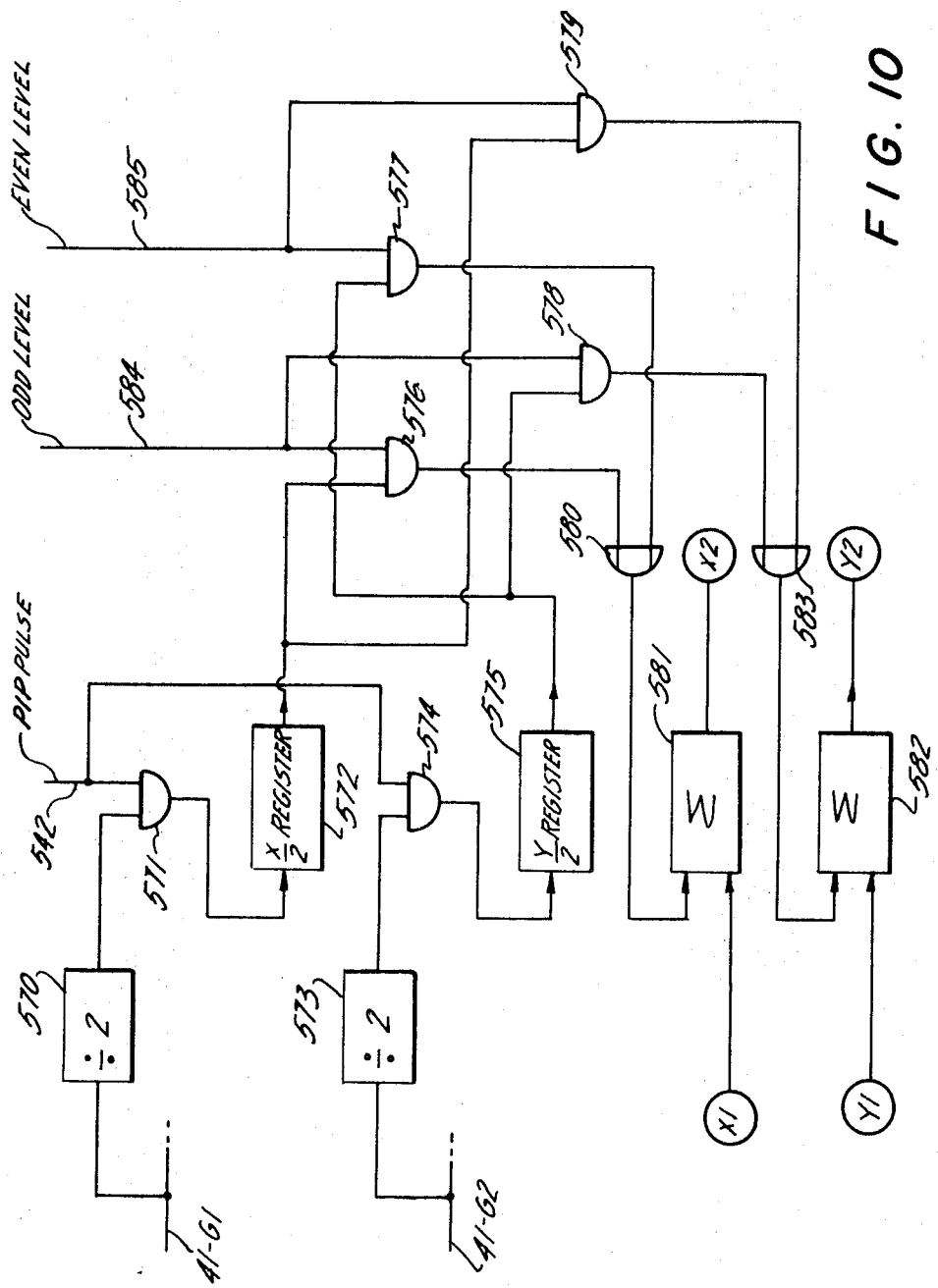

FIG. 8 depicts the arrangement of FIGS. 4—7;

FIG. 9 depicts a second illustrative article-handling apparatus controlled by the system depicted symbolically in FIG. 4; and FIG. 10 depicts an illustrative form of additional circuitry to be included in the system of FIGS. 5—7 for controlling the article-handling apparatus of FIG. 9 in an automatic pallet loading sequence.

BASIC CONTROL SYSTEM OF FIG. 1 FOR LOADING ONE CARTON ON A PALLET

A form of prior art robot control system used in the illustrative embodiments of the invention described below includes a plurality of actuators 19 that produce mechanical operation of the several parts of the robot. A separate actuator is commonly provided for each distinctive motion of the whole robot, e.g., vertical, horizontal, etc., these actuators being represented by the common block 19. Each actuator (e.g., a hydraulic cylinder) is controlled for movement by a respective combination-code coordinate transmitted from memory drum 10 via read circuit 34 and over cable 31. Each actuator is coupled by a shaft or other coupling 18 to a respective digital encoder 17. The output of each encoder is a combination code that represents the instantaneous position of the robot element moved by that actuator. A series of summers 16 are provided, one such summer for each actuator. The coordinate transmitted by read circuit 34 from the memory drum to the actuator is coupled to the positive input of the summer. The instantaneous position of the robot element controlled by the actuator, as represented by encoder 17, is coupled to the negative input of the summer. The difference is transmitted to the actuator input. When the robot element has been moved to the position represented by the actuator coordinate in the memory drum, the summer output is zero, and motion stops. Where a hydraulic cylinder is used as an actuator, the output of the summer controls its valve. Suitable details that are not part of the present invention provide for deceleration as the motion nears its end-point.

Each of entries 1—N in the memory drum in the column labeled "actuator coordinates" includes a combination-code coordinate for each robot element which must be moved to a prescribed position during each step of the program. Such a robot typically includes coincidence detector 21a for determining when all elements have moved to the required positions, that is, when all of the summer outputs are zero, to enable the robot to perform the next function dictated by the recorded program. This may be an operation of the article gripper to grip or to release an article, or a variety of other functions may be initiated; or the next function may be an advance for reading of another slot in the drum so that the next set of actuator coordinates can be transmitted over cable 31 to the summers 16.

The actuators 19 are shown coupled by rods 22 to article handling apparatus 20. The article handling apparatus generally includes a gripper such as a pair of jaws for gripping an article at a pickup location. The apparatus also includes elements for transporting the jaws in three dimensions and for turning the jaws as for changing the orientation of an article carried by the jaws. Each actuator that responds to a combination-code recording ordinarily operates a different element of the robot.

The memory drum 10 includes another column of entries labeled "function control signals." Each time a slot in the memory drum is read, any function-control signals present in that slot are conventionally transmitted over cable 23 to the related elements included in the article handling apparatus and in external apparatus that is to be coordinated with the robot or which is to control the robot. These signals control various functions. For example, a signal of this type may be used to cause the article holder to seize or release an article. Such a signal is useful, also, to turn on welding equipment carried by (or replacing) the robot jaws in order to weld some article on an assembly line after the actuators controlled by combination codes have moved the welding equipment to the proper position. Such robots perform various functions.

The memory drum includes a third column labeled "slot selection instructions." Each instruction included in the memory drum, together with the same-numbered entries in the "actuator coordinates" and "function control signals" columns are sensed concurrently and form a "slot." The "instruction" may be used to select another step in the program to be executed, often the next slot in the drum or, when necessary, a different selected slot.

The article handling apparatus typically operates in conjunction with a number of function controls 21. These controls are activated in response to recordings in the function control recordings of drum 10, recorded (as needed) by write circuits under control of function selector 24. One function control 21 is here assigned to the special function of operating switch 26 out of the illustrated position to a position in which one of the actuators 19 becomes subject to sensor 250 in the nature of a limit switch. Multiple limit switches may be provided, in practice, in progressive positions to produce deceleration, or sensor 250 may represent a control valve having decelerating control effects. This part of the control system is discussed below in greater detail. Switch 26 is interposed in a particular channel of the several channels represented by cable 30. Accordingly, operation of switch 26 into position for control of an actuator 19 by sensor 250 does not disturb control of other actuators of the robot by summers 16, for responding to recordings on drum 10.

The robot includes a write circuit 27 which is coupled over cables 32 to the memory drum to control the writing of data into the drum. Data is read from the drum by read circuit 34 and transmitted to the actuators and the article handling apparatus over cables 23, 23a and 31. Memory drum 10 may be of a type that advances stepwise, or it may rotate continuously at high speed, or a static memory matrix may be used. Read and write circuits 34 and 27 normally include registers for temporarily storing information. Thus, when an appropriate memory drum slot is adjacent the read heads, information may be read from the drum and stored in a read register. Similarly, information to be entered into the drum can first be placed in write registers and later entered into a selected slot of the drum by operating recording control 12 at a convenient time. This arrangement is used to special advantage in achieving some purposes of the invention, as will be recognized in due course. Such recording controls are ordinarily manual, but for present purposes the controls are automatic in some instances, as for enabling information to be entered into the drum at the same time that a program step is being executed by the robot under control of the information taken from the drum and temporarily stored in the read register.

As disclosed in the aforesaid patents, robots of a class that are specially suited to present purposes are provided with a manual control 13 which enables an operator to control movements of the various actuators in the article handling apparatus. This is shown symbolically by cable 31a extended from manual control 13 via switching means 14 and 26 to actuators 19. Switching means 14 removes the actuators from control by summers 16. When the actuators are under manual control and the desired position is reached in all coordinates, the outputs of actuator encoders 17 represent these coordinates. The output of the encoders is transmitted over cable 29 to a section of the write circuit 27 which contains many gates under control of recording control 12. The operator can then actuate recording control 12 to transmit a signal over cable 25 to the write circuit 27 which causes the combination codes in the output of the encoders to be written into the memory drum. At the same time, the operator can use separate parts of recording control 12 and write circuit 27 to enter the appropriate "function control" and "slot set instructions" in the same slot of the drum at portions of the drum corresponding to the similarly labeled columns in the drum. This sequence is repeated for every step required of the robot in customary applications.

This procedure allows a complete program to be stored in the drum—with all of the necessary coordinate information—without the operator even being aware of the exact coordinates. Thus, the operator manually controls the robot to go through the desired routine. Each time another step is taken, the precise terminal coordinates are automatically stored in the robot memory drum, along with whatever additional instructions and function control signals are required. Of course, the latter are written deliberately by the operator in most cases. The complete program stored in the drum is sufficient to control the robot thereafter to go through the same routine repeatedly without any operator intervention.

The choice of the slot in the memory that is next to be in position for reading and for control of the apparatus, or for entry of control recordings, may be manually controlled by using manual slot selector 15. A digital code from manual control 15 is compared with the output of "read" circuit 34a associated with the "slot number" part of the drum for rendering slot selector 11 operative when there is identity. The slot selection may be mechanical, or it may be electronic as by activating read circuit 34, depending on the type of drum used. By operating switch 14a to the position in the drawing, the slot selection may also be controlled automatically, in various ways. For example, after output from unit 21a indicates that the coordinate and function instructions of any given slot have been carried out, the next slot that is to be effective may be the next-following slot of the drum. In that case, a function-selecting circuit 21 can be activated by an entry in drum 34 for causing transfer of the "slot number" of the drum presently in effect and registered in read circuit 34a, from that read circuit into register 34c. This register contains an adder that increases by "1" the number transferred from read circuit 34a. The function selector also controls a gate 34d to determine when comparing unit 34b shall respond to unit 34c. As another alternative, a channel of function control 21 can complete a circuit from the read circuit 34 of the "slot selection instruction" part of the drum via "and" gate 34e to comparing unit 34b. In that condition, the next slot to be effective will be the number of the slot that was read from the slot selection part of the drum.

"Read" circuit 34a also provides code output that can be available when needed for entry into the "slot selection instruction" part of the drum, via write circuit 27 under control of unit 12. The slot number in effect for read circuits 34 can be relayed by read circuit 34a to a register in write circuit 27 and entered into the drum by a part of recording control 12, as required. This is used during the "teaching" of a new program, primarily when the article transfer robot is being operated under control of manual controls 13 and 15; and at this time function selector 24 can be used to control entry of function control recordings into the appropriate track of the drum.

The foregoing represents a basic form of control of an article handling robot that is largely known to the prior art. It is utilized in carrying out various functions of the article handling apparatus that is to be discussed and is modified for that purpose as will be seen.

CARTON TRANSFER APPARATUS OF FIG. 2

FIG. 2 depicts an article handling apparatus, designated 20 in FIG. 1, which can be controlled in the manner described above for transferring cartons from place to place. It is to be understood that the article handling apparatus of FIG. 2 operates under control of the apparatus of FIG. 1 and incorporates the necessary actuators and encoders described in FIG. 1. FIG. 2 is intended to show a simplified form of apparatus which can be employed effectively for pallet loading. The three primary motions of the article holder in FIG. 2 are along X-, Y- and Z-coordinates. In the copending application, Ser. No. 748,703 mentioned above, a suitable arrangement of actuators and encoders is illustrated in an X-, Y- and Z-operator; and there it is also shown that other apparatus is adaptable to pallet loading, wherein jaws are carried on an arm movable in a polar-coordinate system. The X-, Y-, Z-apparatus of FIG. 2 for transporting the jaws is for illustrative purposes.

The article handling apparatus in FIG. 2 is mounted on four corner posts 244. Two trolley bars 240, 242 are attached between respective pairs of the posts in the Y-coordinate direction. Travelling heads 236, 238 are mounted for movement in the Y-direction on these trolley bars, respectively. A first actuator drives the heads 240, 242 to transport head 212 in the Y-direction. Head 212 carries the article grippers (to be described) which seize and release cartons 246.

Mounted between the two heads 236, 238 is another trolley bar 234 extending in the X-coordinate direction. This trolley bar extends through head 232. A second actuator controls movement of head 232 in the X-direction along trolley bar 234. Extended through head 232 is a vertical shaft 230 which, when moved by a third actuator, move in the Z-direction, that is, along its own length. Shaft 230 is attached to head 212. A fourth actuator rotates head 212 selectively clockwise or counterclockwise as shown by arrows 231, such actuator being contained either in head 212 for rotating the latter about shaft 230 or in head 232 for rotating shaft 230 and head 212.

At two adjoining sides of head 212 there are disposed two grippers 214, 218, each attached to the underside of the head 212 by a respective rod. These grippers serve to bear against two intersecting sides of a carbon. The grippers are not movable with respect to head 212. The intersection of the inner faces of the two grippers is along a line coincident with the axis of shaft 230. Thus, if shaft 230 is rotated while the grippers are holding a carton, the carton will be rotated around the vertical corner defined by the inner faces of grippers 214, 218.

Also attached to head 212 are two cylinders 224, 228. Rods 222, 226 move within those cylinders, respectively. Grippers 216 and 220 depend from the ends of rods 222 and 226, respectively, so that grippers 214 and 216 form one clamp and grippers 218 and 220 form a clamp at right angles to clamp 214, 216. A fifth actuator contained in head 212 controls the movement of rod 222 and the relative displacement of gripper 216 from gripper 214. An encoder in head 212 is associated with this actuator, and provides an output which represents the distance between the two inner faces of grippers 214, 216. Similarly, a sixth actuator controls movement of rod 226 and the relative displacement of grippers 218 and 220; and an encoder in head 212 is associated with this actuator, and represents the distance between the inner faces of these two grippers.

It should be noted that although grippers 214, 218, as well as grippers 216, 220, are shown as being relatively thick, in actual practice they should be quite thin. Spaces will appear on the loaded pallet between adjacent cartons due to the thickness of the grippers, unless complex movements are added to avoid those spaces. The plate thickness should therefore be kept to a minimum, consistent with strength requirements. The encoders can be adjusted to include the thickness of a plate 214 or 218 with the actual dimensions of the cartons, where spaces are to remain between the cartons.

The encoders connected to shafts 222 and 226 enable the pairs of plates 214, 216 and 218, 220 to serve as calipers for measuring the size of the cartons, in addition to their article-gripping function. It would of course be feasible to use a vacuum article holder in some cases, and then the plates could be used as calipers only, and in that there would be no spaces between cartons. Those spaces can be avoided in other ways, if found objectionable.

Attached to the inner face of gripper 220 is a pressure switch or sensor 252. This sensor provides an output signal when the inner face of gripper 220 bears against a side of a carton firmly enough to press the opposite side of the carton against plate 218. A similar sensor 254 is provided on the inner face of gripper 216. The two grippers move in the respective directions shown by arrows 221. As will be described below, the robot recognizes that the four grippers have firmly gripped a carton when the two sensors have operated.

Movement of shaft 230 in the vertical direction by the third actuator controls movement of head 212 and the four grippers in the Z-coordinate direction. On the underside of head 212 there is a third sensor 250 (see also FIG. 1) which is operated when the underside of head 212 bears against the top of a carton. This sensor is used to notify the robot when head 212 has been lowered sufficiently to bear against the next carton to be loaded on the pallet.

FIG. 2 also shows a pickup point represented by bin 248 containing a carton 246 in one corner thereof. The carton has length, width and height dimensions as shown by the letters L, W and H. A suitable conveyor mechanism (not shown) continuously delivers cartons 246 to the corner of the bin, along a line represented by arrow 245, with the longer dimension of each carton extending along the forward wall of the bin. The article handling apparatus is used to lift successive cartons from the bin and to place them on pallet 256. The robot of FIG. 2 with the control apparatus of FIG. 1 is initially controlled manually to lift a first carton from bin 248 and to place it at the corner of pallet 256 defined by the intersection of edges 264, 266, and this program is recorded and it is thereafter repeated automatically under program control, for loading the first article on any given pallet.

LOADING OF A SINGLE CARTON ON A PALLET

The operator moves the various parts of manual control 13 for operating the actuators of the robot in the X- and Y-directions until it is above carton 246 in bin 248, with the axis of shaft 230 approximately aligned with vertical corner 258 of the carton. This step is then entered in the drum. Although the basic program is written with respect to a particular carton, the same program enables the robot to operate on cartons of any size. For this reason, at the same time that the operator moves the head 212 to a position over the carton, he controls the fifth and sixth actuators to move grippers 216 and 220 to their maximum extended positions. For assurance that the first set of coordinates written into the drum define the right position of the axis of shaft of 230, in line with corner 258 of the carton, the operator can actually cause head 212 to be moved down over the box to a position such that grippers 214, 218 bear against the two respective sides of the carton. Optionally this motion includes a short motion in the X- and Y-directions, to press plates 214 and 218 against X- sides of the carton. Thereafter, without changing the positions of the X- and Y-actuators, the head 212 is raised by the third or Z-actuator to a position higher than the maximum height of the cartons to be handled by the robot. When the head is in the raised position, the attendant can operate recording control 12, causing the coordinate information provided by the encoders and related to the S-, Y- and Z-actuators to be written into the first slot in the memory drum. The attendant advances drum 10 to the second slot, and uses function selection unit 24 to enter a control recording that is related to that function control 21 (among various function controls 21) which operates switch 26 to shift the Z-actuator 19 for moving head 212 downward so as to subject that motion to control by sensor 250. During the setup operation, the same effect can be achieved by moving the particular manual switch 14 which is related to the Z-actuator 19 into its extreme right-hand setting. The Z- and Y-coordinates of shaft 230 are recorded in the second slot when recording control 12 is operated, and at the same time suitable function control recordings are entered into the second column of the drum 10 for operating switch 26 so that the downward motion of head 212 takes place under control of sensor 250 for picking up a carton in the subsequent automatic operation.

The thus recorded function control signal informs the Z-actuator to move head 212 down until sensor 250 is operated, that is, until the underside of head 212 presses against the top of carton 246, and then the Z-motion stops. The signal from sensor 250 can also be used to activate the actuators 19a, 19b for moving heads 216 and 220 under control of their sensors 252 and 254, respectively, for firmly gripping the carton. These sensors could be omitted entirely by using a limited-pressure system for causing the clamps to grip a carton, using any other suitable signalling system to indicate when a carton has been gripped.

The attendant then manually controls the raising of head 212 to an elevated position. During this operation no others of the various actuators 19 are operated. With the carton in the raised position, control 12 is operated. All of the coordinate information is written into the third slot in the memory drum. This third slot in the program controls the raising of any carton operated on by the robot.

The attendant then controls movement of the article handling apparatus under manual control only in the X- and Y-directions until the carton is above pallet 256 and edge 258 is directly above the corner of the pallet defined by edges 264, 266 and labeled "PALLET (O,O)." As in the first step, it is necessary to position the carton such that edge 258 is in a predetermined X-, Y-position. This may be difficult for the operator to do if the carton is held in the elevated position. For this reason, during this step the operator can manually control the X-, Y- and Z-coordinate actuators in such a way that the carton is actually placed on the pallet in the desired position. But before any coordinate information is written into the drum, the carton is raised in the Z-direction to the elevated position. Thereafter, control 12 is operated to enter the recording of the X-, Y- and Z-coordinates in the fourth slot of the drum. During subsequent operations, after the carton is raised to an elevated position above bin 248 it will be moved in the X- and Y-directions to an elevated position directly above the desired corner of the pallet. In the drawing, the axis of shaft 230 is labeled "PROGRAM (O,O)" to indicate that the X- and Y-coordinates entered into the drum when the carton is moved to the elevated position above the pallet correspond to the corner of the pallet having coordinates (O,O).

The attendant then controls the recording of an instruction in the fifth drum slot which only causes downward movement of head 212 for lowering a carton to the pallet. However, at this point a problem arises because the robot as described has no means for determining when the carton has been lowered just the right amount so that its bottom surface rests on the pallet. When the head was lowered earlier over the carton in the bin, the robot could determine that movement in the vertical direction should stop in accordance with the operation of sensor 250. But once the carton is gripped, the sensor is continuously operated and as the carton is lowered onto the pallet the sensor may not be dependable for informing the robot control circuit that the downward drive of head 212 should cease. It would be possible for downward drive to be made responsive to the obstruction of downward motion of head 212, since that would signal the deposit of a carton on a support surface. Sensor 250 could then be replaced by or could supplement such a detector. For example, in case the Z-motion actuator is a hydraulic cylinder or motor, the detector for interruption of the downward motion can be a fluid-flow detector that responds to the termination of fluid flow to or from the actuator.

As another way of dealing with this phase of the operation, the attendant can observe the descent of the carton carried by the grippers of head 212 under his manual control. When the carton has reached the pallet, the downward motion is manually terminated, and the Z-coordinate from the vertical-motion encoder can be recorded. That approach is suitable if only the same height of cartons is to be handled subsequently.

A third, more flexible way of dealing with this phase of the pallet-loading operation is described below.

Write circuit 27 is then readied to write information into the next slot. The attendant then controls the movement of grippers 216 and 220 in their outward or release directions. In the case of a single carton to be transferred from the bin to the pallet (without the stacking of cartons on the pallet), the two grippers can be moved outward to a limit or as far as desired by the attendant. However, as will become apparent below in connection with the loading of even levels of the pallet, gripper 220 should not be moved much because it may bear against a previously loaded carton on the pallet load. For this reason, if the attendant were writing a program to be used subsequently for the loading of pallets, he should open the two grippers only far enough to release the carton. This limited movement would not upset the previously loaded cartons on a pallet.

After releasing the grippers, the attendant controls the Z-actuator which lifts head 212 to a safe elevation, taking into account the planned subsequent performance. Control 12 is then operated and the coordinates are stored in the next slot of the drum.

This completes the cycle of transfer of one carton from the bin to a corner of the pallet. If it were desired to repeat this routine over and over again, the attendant simply enters an instruction in the "slot selection" part of the drum for controlling the advance of the drum back to the first slot in the sequence. This will cause the robot to cycle through the same routine over and over again, between the bin and the (O,O) corner of the pallet. U.S. Pat. No. 3,306,471 shows how this routine can be used repeatedly, together with another program that contains the coordinates of each carton on a pallet, including coordinates for each carton in each row and in each level of the pallet. Different sets of coordinates are needed for different sizes of cartons. Generation of each set of coordinates is time-consuming, and the dependence on the availability of coordinate recordings for any given size of carton represents an evident limitation on the use of such prior art program-controlled article transfer robots for loading pallets where the sizes of the cartons or other articles may change from time to time.

MODIFICATIONS OF THE ROBOT OF FIG. 1 FOR LOADING SUCCESSIVE CARTONS AUTOMATICALLY

The robot of FIG. 4 is the same as the robot of FIG. 1 except that it is modified to enable the circuit of FIGS. 5—7 to control the automatic loading of a complete pallet, taking into account the size of the cartons to be loaded on the pallet and the size of the pallet. All that is required of the attendant is the generation of a program for transferring a single carton from a pickup point to one corner of the pallet. In this example, the automatic system assumes that the cartons that are to be loaded on any one pallet are all the same in size.

In FIG. 1, the coordinates for the six actuators are transmitted over cable 31 to a set of six summers, as shown symbolically by the single summer 16. Conductor 31-X in FIG. 4 represents one of the channels in cable 31, the channel over which information is transmitted to the actuator which controls movement of head 232 in FIG. 2 along trolley bar 234, i.e., movement of head 212 in the X-direction. Although cable 31-X originates in cable 31, it does not extend directly to summer 16. Instead, it extends to one input of each of gates 36-XC and 36-XO. Gate 36-XC is normally closed and cable 31-X is thereby effectively extended back to the associated summer 16. However, when a function control signal is applied to conductor 37-X (one of many conductors of cable 23), gate 36-XC is opened and gate 36-XO is closed. At this time, the coordinate information on cable 31-X is transmitted through gate 36-XO to cable 38-X. This cable is extended to FIG. 5 and, as will be described below, the coordinate information on cable 38-X is modified and the modified coordinate information is extended back to cable 39-X. This cable is coupled to the output of gate 36-XC. The thus modified coordinate information obtained from drum 10 is extended to the actuator which controls movement of head 212 in the X-direction. The basic robot operation is not changed. The difference between the arrangements of FIGS. 1 and 4 is that when a control signal is applied to conductor 37-X from the memory drum, the X-coordinate information extended to the X-coordinate actuator is modified in accordance with the operation of the circuit of FIGS. 5—7.

Similar remarks apply to the Y- and Z-coordinate information. In the absence of control signals on conductors 37-Y and 37-Z, the Y- and Z-coordinate information from the memory drum is extended directly to the Y- and Z-coordinate actuators to control the movements of heads 236, 238 in the Y-direction, and the movement of shaft 230 in the Z-direction. When either of conductors 37-Y or 37-Z is energized, however, the associated Y- or Z-coordinate information is extended to the circuit of FIGS. 5—7 over one of cables 38-Y or 38-Z, and the coordinate information returned over the associated one of cables 39-Y or 39-Z is modified in accordance with the operation of that circuit.

In the illustrative program described in the preceding section, there was no specific example of information recorded on the drum in the "function control instructions" column. In the recording of a program by the attendant to control the automatic loading of a complete pallet, however, signals are recorded in various locations in this column, More specifically, in those locations in the drum containing X-, Y- and Z-coordinate data relating to the lowering or raising of head 212 from the pallet, signals are recorded in the "function control instruction" column of the drum to indicate that the coordinate information should be modified in accordance with the operation of the circuit of FIGS. 5—7. Thus, starting with the fourth slot in the drum which specifies the position of head 212 at the elevated position above the pallet, the next few slots which control the sequence of lowering a carton to the pallet, releasing a carton and raising head 212 back to the elevated position, signals are recorded in the "function control instructions" column of the drum to control the modification of the X-, Y- and Z-coordinate data. It is this modification of the data which enables successive cartons to be loaded at different positions on the pallet despite the fact that the basic program of the robot which is executed for each carton specifies the coordinates corresponding to the position of only the first carton on the pallet.

The robot of FIG. 1 is further modified in FIG. 4 to include OR gate 43. In FIG. 1, the output of stop control 11a directly controls slot selector 11 to enable the attendant to interrupt the automatic cycling of the robot when desired. In the circuit of FIG. 4, the output of stop control 11a is extended to one input of OR-gate 43. The other input to the gate, conductor 42, is extended to the circuit of FIGS. 5—7. When this conductor is energized by the external circuit of FIGS. 5—7, advance of the drum to the next program step is blocked, and the robot stops operating.

The third change in the circuit of FIG. 1 relates to inclusion of conductors 40-G1, 40-G2 and 40-Z in FIG. 4. These conductors are coupled to the three sensors 250, 252 and 254 in FIG. 2, and are energized when the respective sensors are operated. The function of the signals on those three conductors will become apparent below in connection with the description of FIGS. 5—7.

The circuit of FIGS. 5—7 requires X-, Y- and Z-dimensions to be supplied, representing the carton dimensions L, W and H. This information is produced automatically in the present apparatus. For this purpose there is a fourth change in the configuration of FIG. 1. Cables 41-G1 41-G2 and 41-Z in FIG. 4 are coupled to the encoders whose outputs respectively represent the distance between grippers 214 and 216, the distance between grippers 218 and 220, and the height of head 212 above bin 248. (Cable 41-Z is connected to the encoders through subtractor 55 as will be described below.) The information transmitted over these three cables informs the circuit of FIGS. 5—7 of the size of the carton. That circuit uses this information for modifying the one-carton loading routine automatically for loading a pallet fully with cartons.

The basic program for loading a complete pallet is different from the program described in detail above for transferring a single carton from the bin to the pallet in that certain "external control signals" must be recorded in the "function control instructions" part of the drum. There are other changes which are required in the program, some of these changes relating to additional circuitry in FIG 4, to be described.

In recording the illustrative program above, after the carton was above the pallet it was lowered by the operator until it was placed on the pallet. At that time, the operator controlled the writing of the coordinate data into the drum so that subsequent cartons of the same size could be loaded in the same position. The program was suitable for use only in conjunction with cartons of the same height. In order for the robot of FIG. 4 to operate automatically for loading cartons of any height on a pallet, the Z-coordinate stored in the drum and which controls the lowering of the carton on the pallet should be the coordinate corresponding to the surface of the pallet. That is, the Z-coordinate to be recorded in the program for loading a carton on the pallet should theoretically be such as to move sensor 250 of head 212 to a position where it bears against the pallet. This represents a carton of zero height. During the loading of the first carton and all other cartons in the first level, that Z-coordainte is modified by the height of the carton being loaded, and for higher layers of cartons the Z-coordinate is additionally modified by increments representing multiple carton heights. In actually recording the program which controls the lowering of the carton on the pallet, if the position of the pallet in the Z-direction is known by the attendant he can directly write this coordinate into the drum. On the other hand, if the coordinate is not known by the attendant, the head 212 can be lowered (first removing the depending clamps) until sensor 250 operates. At this time, the attendant is informed that the undersurface of head 212 bears against the pallet and the Z-coordinate can be recorded in the appropriate drum location. As for the position of bin 248, it may be feasible to place it at a vertical position corresponding to the zero Z-coordinate of the robot or to adjust the Z-encoder for that purpose, so that the Z-position encoder will represent the dimension H when sensor 250 first operates. Alternatively, the bin may have any arbitrary Z-coordinate and the Z-encoder information transmitted over cable 41-Z may pass through an adder or subtractor which modifies it by a fixed constant so that the resulting Z-position coordinate on the cable is zero when head 212 bears against the bin. This will also provide dimension H on the cable when sensor 250 first operates.

A still different solution to the problem is shown in FIG. 4. During the initial recording of a program for transferring one carton from the bin to the pallet, which is here called the learning routine, a carton of known height is used. This height is first stored in standard height register 47. Ordinarily, the Z-encoder data is transmitted to the write circuit 27 through gate 45-ZC in the path of cable 29-K, When conductor 56 is energized, however, gate 45-XC is opened and the data from the Z-encoder is transmitted through gate 45-ZO to the plus input of subtractor 48. Since the height of the carton is subtracted from the Z-encoder data in subtractor 48, the output data on cable 52 represents the Z-coordinate of the bin floor. This operation takes place, i.e., conductor 56 is energized, only during the learning routine when the carton of standard height is operated upon.

The Z-coordinate of the bin is transmitted over cable 29 to the write circuit 27 to be recorded in the proper location of the drum. It is also transmitted to one input of AND-gate 53, another input to which is energized by the signal on conductor 56. The Z-location of the bin floor is thus stored in Bin Z-Register 54. At this time, a third input to gate 53 is energized by manual control 49a.

During subsequent automatic operation, the Z-encoder data is extended to the plus input of subtractor 55. The bin Z-location, extended from register 54 to the minus input of the subtractor, when subtracted from the Z-encoder data provides the actual height H of the carton worked on. It is the actual height which is transmitted over cable 41-Z to the circuit of FIGS. 5—7. This is discussed below in further detail.

Conductor 56, energized only during the writing of the initial routine, is connected to the output of AND-gate 46. One input of this gate is connected to manual control 49 that is operated when it is necessary to record the Z-location of the bin floor. As head 212 is lowered, it strikes the standard-height carton, and conductor 40-Z is energized. When this happens, a signal is sent over conductor 51 to turn on gate 46.

The same circuit is used to record the Z coordinate of the pallet at the proper slot of the memory drum during the recording of the basic carton-transfer program. At this time, however, manual control 49a is set to disable gate 53 so as to preserve the previous entry in the Bin Z-Register 54. With the known-height carton resting on the pallet and the carton clamps released, head 212 is manually operated under control of sensor 250 to press down on the carton. When downward motion is arrested under control of sensor 250, the Z encoder signal reaches subtractor 48 via gate 45-ZO. The difference appearing at the output of the subtractor on cable 29-Z reaches write circuit 27 for entry in the proper location of the drum, as the Z-coordinate of the pallet surface.

Another change in the program for loading a single carton on the pallet is desirable for loading multiple layers of cartons in a stable pattern. This change provides for the rotation of shaft 230 during loading of "even" levels (2, 4, etc.) of cartons on the pallet. Shaft 230 is caused to rotate 90° between the bin and the pallet in the clockwise direction (as viewed in FIG. 2) and to rotate 90° reversely in the return travel of head 212 to the bin. More specifically, at the same time that the X-, Y- and Z-carton-depositing coordinates are modified by the circuit of FIGS. 5—7 in loading even layers of cartons, shaft 230 must be rotated.

For this purpose, conductor 44 is extended from the circuit of FIGS. 5—7 to cable 24 in FIG. 4. A signal on conductor 44, equivalent to any other signal from function control unit 21 or external control source 21b provided with the robot, informs the control circuit that shaft 230 must be rotated. Instructions in the slots of the drum corresponding to the steps involved in the transfer of head 212 from the bin to the pallet while raised, the lowering of head 212 to the pallet and subsequent raising of the head appear on line 33. If conductor 44 and line 33 are both energized, a command is sent via gate 33a to control unit 19a of the actuator which rotates shaft 230. Shaft 230 must be rotated 90° in the clockwise direction during those steps in the loading of every even level on the pallet, in order that alternate levels of cartons be arranged with the long dimension of the cartons of each layer crossing the long dimensions of the cartons of the next-lower layer. This is to insure the stability of the entire load.

Before proceeding with an analysis of FIGS. 5—7, the loading patterns of FIG. 3 will be described.

FIGS. 3A AND 3B—LOADING PATTERNS

The diagram for the odd levels in FIG. 3A shows the numbering of the cartons. Each carton is labeled 246–XXX. The first digit following the number 246- represents the level on the pallet, the second digit represents the row, and the third digit represents the position of the carton in the row. The first carton loaded on the pallet, corresponding to the carton shown on FIG. 2, thus bears the designation 246–111. The carton which is loaded next to it is designated 246–112. It is also in the first level and in the first row, but it is the second carton in the row. The last carton loaded on the first row on the first level is 246–11n. Similar remarks apply to the other rows in the first level and the other levels. It should be noted that all of the cartons loaded in the first and all other odd levels are loaded with their longer dimension L in the X-direction. This is the situation shown in FIG. 2.

To secure a more stable load on the pallet, the even levels are loaded with the cartons rotated clockwise 90°, that is, with the longer dimension L extending in the Y-direction. The even level shown in FIG. 3B is the second level, and thus the first digit following each carton designation 246- is the numeral 2. It is apparent from the diagram that the 90° rotation of shaft 230 causes the longer dimension of each carton to be in the Y-direction when the carton is deposited.

However, the rotation of shaft 230 by 90° necessarily affects the position of each carton along the X- and Y-axes. Referring to FIG. 2, it will be noted that the axis of shaft 230 is designated "PROGRAM (O,O)." In discussing the coordinates of the robot, some reference must be taken for the X- and Y-axes. The axis of shaft 230 is selected here. The basic robot program is such that when each carton is lowered to the pallet, the axis of shaft 230 is directly above the corner of the pallet designated "PALLET (O,O)." Thus, when the first carton is loaded on the pallet, its edge 258 will correspond to the corner of the pallet as shown for the odd-level loading pattern of FIG. 3A. To load the second carton on the pallet, all that is required is to increment the X-coordinate (while the carton is being loaded onto the pallet and the grippers then raised) in order that edge 258 of the second carton shall have the same Y-coordinate as the first carton, but an X-coordinate greater by the length of the carton. Similar remarks apply to all of the cartons loaded in any row—the X-coordinate which controls the loading of every carton is incremented by the circuit of FIGS. 5—7 prior to the loading of each carton except the first.

The Y-coordinate must be incremented by the width of the carton for loading cartons in the second row. As for the X-coordinates, they must be incremented in the second and succeeding rows by the length of each carton prior to the loading of each carton except the first.

This cycle is repeated for each row during the loading of the first and every other odd level of the pallet.

It will be recalled that in order to alternate the stacking patterns, each carton is rotated 90° about its edge 258 in loading even levels or layers. Except for this rotation, the basic carton loading program is the same. Program coordinate (0,0) corresponding to the X- and Z-coordinates of edge 258, still corresponds to corner (0,0) of the pallet. This is due to the fact that while rotation of shaft 230 necessarily affects the X- and Y-coordinates of all other points on a carton, it does not affect the X-, Y-coordinate of the vertical corner 258 since the carton is rotated about this axis. Consequently, the first carton of an even level would ordinarily be loaded with corner 258 corresponding to the corner of the pallet. But with the carton rotated 90° around this edge, the entire carton would be to the left of edge 266 of the pallet. This situation is shown in FIG. 3B by the carton 246-211' that is shown in dotted lines. Its corner 258' corresponds to the program coordinates (0,0). Needless to say, this situation is unacceptable because the first carton in every row of every even level would be loaded off the pallet. The situation can be corrected by incrementing the X-coordinate controlling the loading of the first carton in each row of each even level of the pallet by the width of the carton. For this reason the circuit of FIGS. 5—7, when even levels are being loaded, causes the X-coordinate to be incremented by the width of the carton prior to the loading of the first carton in each row. Thereafter, in order to properly place successive cartons in each row, the X-coordinate is incremented by the width of each carton prior to its loading. As for the Y-coordinate, it is incremented by dimension L prior to the loading of each row, except the first.

Thus, to summarize the differences between the odd and even level patterns, the following can be said:

1. During odd-level loading, shaft 230 is not rotated, and during even-level loading it is rotated 90° in the clockwise direction.
2. During odd-level loading, prior to the loading of every carton except the first, the X-coordinate is incremented by the length of the carton, while in even-level loading, prior to the loading of every carton including the first, the X-coordinate is incremented by the width of the carton.
3. During odd-level loading, prior to the loading of the first carton in any row except the first, the Y-coordinate is incremented by the width of the carton, while in even-level loading, prior to the loading of the first carton in any row except the first, the Y-coordinate is incremented by the length of the carton.
4. Since the basic Z-coordinate used in the program for lowering head 212 to place a carton on the pallet corresponds to the Z-coordinate of the pallet itself, prior to the loading of the first and all other levels, the Z-coordinate used to place a carton directly on the pallet is incremented by the height of the carton.

MULTIPLE-CARTON LOADING CONTROLS FIGS. 5—7) USING STRUCTURE OF FIG. 2

Before proceeding with a description of the circuit of FIGS. 5—7, one clarifying remark must be made about the symbology employed. Much of the information transmitted throughout the circuit consists of digital coordinate data or dimensions, involving the transmission of a number of bits. An appropriate circuit can be constructed to operate on either a parallel or serial basis. The illustrative circuit operates on a parallel basis. When coordinate data is transmitted over a particular path, it is assumed that the path includes a number of channels even though only a single conductor is shown in the drawing. Also, certain gates are shown with two or more inputs, some of which are simply control conductors and at least one of which, in practice, is a cable over which parallel information is transmitted. In the actual construction of the circuit of FIGS. 5—7, such a gate may comprise a plurality of gates equal in number to the number of bits in the information to be transmitted, and the control conductors would be extended to the control inputs of each gate. In order not to needlessly complicate the drawing, a single gate has been shown in many instances, one of whose inputs is represented as a cable over which multiple-bit information is transmitted in parallel, and the other or others of whose inputs are simply control conductors for enabling the operation of the gate. It will be readily apparent which gates are of this type inasmuch as coordinate or dimensional data is transmitted through each of these gates when the associated control conductor or conductors are energized.

As a matter of convenience, the elements in FIGS. 5, 6 and 7 bear "500," "600" and "700"-series numerals.

The apparatus of FIG. 2 shows a pallet 256 in position for loading. Any suitable pallet advance mechanism 710 is to be located there for removing each newly loaded pallet from this position and replacing it with an empty pallet. In the ordinary operation of the system, after a pallet has been completely loaded, comparator 708 operates and triggers pallet advance mechanism 710 through OR gate 713. The pallet advance mechanism transmits a signal over stop conductor 42 during its cycle of operation for causing the robot to cease cycling until the filled pallet is removed and a new pallet is moved into the loading position. Following the placing of a new pallet in position, the signal on stop conductor 42 is removed and the robot continues to cycle through its program. At the same time, a "pallet in place" pulse on PIP pulse conductor 542 is generated by the pallet advance mechanism to control various operations in the circuit of FIGS. 5—7. In this apparatus, described in detail below, the stop signal on conductor 42 is generated immediately after the grippers have come against the various sides of the carton in the bin or pickup point, and all three sensors 250, 252 and 254 have operated.

In order to start the loading of the first pallet, the attendant causes the robot to cycle through the steps which cause the grippers to bear against a carton in the bin. The pallet advance mechanism 710 is then triggered by operating switch 712. The operation of switch 710 transmits a signal through OR-gate 713 to the pallet advance mechanism. After the automatic operation is under way, the signal that indicates each cycle of pallet advance mechanism 710 is supplied through gate 713 by comparator 708. The pallet advance mechanism then controls the placing of a new pallet; and after the new pallet is in place, the pallet advance mechanism (having completed its cycle of operation) terminates the stop signal on conductor 42 and applies a pulse to conductor 542. In case a pallet-advance mechanism is not used, a manual control can be operated by the attendant to develop pulse PIP after having placed an empty pallet in the prescribed loading position.

This pulse PIP is extended to the clear inputs of X-register 501, Y-register 601, and Z-register 701. It is also extended through OR gate 515 to the clear input of X-counter 516, through OR gate 613 to the clear input of Y-counter 614 and directly to the clear input of Z-counter 706. The three registers and the three counters are thus cleared.

The PIP pulse on conductor 542 is extended through delay 503 to one input of AND-gate 502. The other input of this gate is extended to cable 41–G1 on which appears the output of the encoder which represents the separation of grippers 214 and 216. The data is transmitted through gate 502 and stored in X-register 501 that was cleared by the PIP pulse just before the delay. The register thus contains the larger dimension L of the carton.

Similarly, the PIP pulse on conductor 542 is extended through delay 603 to one input of AND-gate 602, the other input to which is cable 41–G2. This cable is extended to the output of the encoder which represents the distance between the grippers 218 and 220. Consequently, the dimension W of the carton gripped by the robot is stored in the Y-register immediately after it is cleared.

The PIP pulse on conductor 542 is also extended through delay 703 to one input of AND-gate 702. The other input of this gate is coupled to cable 41–Z which is connected to subtractor 55 (FIG. 4). It will be recalled that the robot stopped operating immediately after the carton was gripped and that it starts operating again when the PIP pulse on conductor 542 is generated. The pulse immediately clears register 701 and after a delay measured in microseconds, the PIP pulse is extended to an input of AND-gate 702. Thus, at the time the gate is enabled to operate, the robot has not moved from its initial position gripping and bearing down on the carton in the bin. Subtractor 55, which subtracts the height of the bin floor from the Z-coordinate of head 212 as it bears on a carton in the bin, provides Z-register 701 with the height of the carton in the bin. Thus, the height of the carton is stored in the Z-register 701.

Referring to FIG. 4, it will be recalled that conductor 38–X is the conductor which carries X-coordinate data from the memory drum to the X-coordinate actuator. Conductor 38–X is extended to FIG. 5 and terminates at terminal X1 within the block labeled 528. The box includes another terminal X2 connected to one input of summer 529. In the form of the control circuit now being described, applicable to the apparatus of FIG. 2, terminals X1 and X2 are connected to each other. They are shown as separate terminals in FIG. 5 only because for a modification of the control system to adapt it to use with the apparatus of FIG. 9, an additional element is inserted between the two terminals X1 and X2. As far as the circuitry for operating the apparatus of FIG. 2 is concerned, cable 38–X is extended directly to one input of summer 529.

The other input to the summer is extended to the output of X-counter 516. Since the counter is initially cleared, the output of summer 529, connected to cable 39–X, is the same as the input on cable 38–X. Consequently, the X-coordinate information that is transmitted to the X-coordinate actuator over cable 39–X at the output of summer 529 is the same as that stored in the memory drum. This is the X-coordinate of the delivery point at the pallet for the first carton, at the corner of the pallet. It will be recalled that in connection with the loading of the first carton in each row of the first and any of the other odd levels, as discussed above in connection with FIG. 3A, the X-coordinate supplied by the drum 10 is not incremented in preparation for transferring the first carton to the pallet.

The Y-coordinate information is transmitted from the memory drum 10 over cable 38–Y. This cable is extended to terminal Y1 in the block labeled 530 on FIG. 5. In the first illustrative embodiment of the invention, terminals Y1 and Y2 in block 530 are to be considered connected together. Consequently, cable 38–Y is effectively coupled directly to one input of summer 616. The other input to the summer is coupled to the output of counter 614 which is initially cleared. Consequently, the Y-coordinate information which is transmitted over conductor 39–Y from the summer to the Y-coordinate actuator is the same as the Y-coordinate information stored in the memory corresponding to the corner of the pallet. During the loading of any level, the Y-coordinate information is not changed until after the first row has been loaded.

The Z-coordinate information is transmitted over cable 38–Z to one input of summer 707. It will be recalled that the program was recorded such that this Z-coordinate represents the level of the bin floor. It is necessary to increment the Z-coordinate by the height of the carton in order that the carton just be lowered to the pallet. The Z-register 701 contains the height of the carton provided by subtractor 55 as a result of the initial operation of AND-gate 702. It will be noted that the output of AND-gate 702 is extended through one input of OR gate 705 to the input of counter 706. Thus, after a delay period of delay 703 following the application of a PIP pulse to conductor 542, the height of the carton is stored in Z-counter 706. Immediately after the pallet is placed in position, the Z-coordinate on cable 38–Z (which represents the bin floor) is modified in summer 707 by the addition to it of the value provided by subtractor 55, which is equal to the height of the carton. The incremented Z-coordinate, representing the height of a carton added to the Z-coordinate of the bin floor as stored in drum 10, is transmitted from summer 707 over cable 39–Z to summer 16 of the Z-coordinate actuator. At this time, however, when the first carton that is to be loaded on a new pallet is resting on the floor, the Z-actuator is operated downward under control of sensor 250. This is due to a recording in the "function control instruction" part of the slot of the drum that causes downward motion of head 212 toward the bin, thereby activating the related part of function control 21 to operate switch 26 accordingly.

With a new pallet in place and with the stop signal of line 42 terminated by the pallet advance mechanism 710, the robot goes through the regular carton-transfer routine. The Z-coordinate in the slot of drum 10 corresponding to the downward motion of head 212 toward the pallet is modified so that the first carton can be lowered to the surface of the pallet, head 212 stopping one carton-height above the pallet. The first carton is deposited at the corner of the pallet as shown in the odd-level diagram of FIG. 3A. Thereafter, the robot jaws open, and the robot starts to execute the basic carton-transfer program once again. In subsequent operations of head 212 for engaging additional cartons in the bin, it may be preferable to operate the head downward under control of its Z-encoder 17 and its Z-summer 16 rather than under control of sensor 250. In that case, the activating of sensor 250 to control downward movement of head 212 can be made responsive to a PIP pulse for automatically gauging the height of the first carton of each new pallet and for entering that height in the Z-register 701 and the Z-counter 706.

As soon as the second carton is first gripped by the robot, all three sensors 250, 252 and 254 operate and all of conductors 40–G1, 40–G2 and 40–Z are energized. (In FIG. 4, external control unit 21b represents these sensors.) These three conductors are extended to the three inputs of AND-gate or coincidence gate 531, and the output of the gate is energized. The output signal is differentiated by differentiator 532 and the resulting pulse on conductor 543 is extended to two loading-mode controlling gates 510 and 512. More particularly, the pulse on conductor 543 passes through one input of OR-gate 513 to a first of the three inputs of one loading-mode controlling gate 512.

The pulse on conductor 543 indicates that a carton in the bin has been gripped. A typical robot includes a mechanism in function control 21 for generating an advance pulse after each instruction is executed to control execution of the next instruction. In one instance described above, coincidence unit 21a (FIG. 4) signals completion of the program-coordinate instructions in all degrees of freedom and this activates the related function control 21 to determine the next slot of the drum that is to be sensed. In case of the gripper-closing step of the program, a simple timer in unit 21 can be relied on for the signal to advance the slot-selection part of the system. That timer program-advance pulse following operation of all three sensors can be used to energize conductor 543 in lieu of the signals generated on conductors 40–G1, 40–G2 and 40–Z. Alternatively, the output of differentiator 532 can be used as an input to unit 21 to advance the program.

A second of the inputs to gate 512 is connected over conductor 536 to the 1 (even level) output of odd/even flip-flop 615. This flip-flop is in the 0 state when an odd level is being loaded and is in the 1 state when an even level is being loaded. The initial PIP pulse on conductor 542 is extended to the set 0 input of the flip-flop 615 to set it in the 0 state prior to the loading of the first level on the pallet. Consequently, when the first level is being loaded the input of gate 512 connected to conductor 536 is deenergized and this gate does not operate.

The pulse on conductor 543 from the output of differentiator 532 is also extended to one of two controlling inputs of the second loading-mode controlling gate 510. A second controlling input of this gate is connected to conductor 539 which is coupled to the 0 output of flip-flop 615. Consequently, this gate is enabled during odd-level loading to transmit information supplied to the third input of gate 510 by the output of X-register 501. As soon as the second carton is gripped and the three sensors operate, the number stored in the X-register (the carton dimension L) is extended through gate 510 to one input of OR-gate 511. The output of this OR-gate is coupled to the input of X-counter 516. The X-counter was initially cleared. With the operation of gate 510, X-counter 516 is incremented by the value of the long dimension L of the carton.

Thus, as soon as the second carton is gripped, the X-counter represents the dimension L. The output of the counter, connected to one input of summer 529, causes the initial X-program coordinate corresponding to the O-coordinate of the pallet in the X-direction to be incremented by the value L. The second carton is loaded in position 246-112 as shown on FIG. 3A due to the modification of the X-coordinate as the carton is being lowered to the pallet.

After the second carton is deposited, the robot shifts head 212 to the bin and picks up another carton. (It will be recalled that during the carton pickup from the bin, the X-, Y- and Z-coordinates as read from the record drum 10 are not modified by summers 529, 616 or 707 because coordinate modifying conductors 37-X, 37-Y and 37-Z of FIG. 4 are not energized by a sensed function-control recording.) As soon as the third carton is gripped, gate 531 operates once again and the contents of X-register 501 are once again transmitted through gates 510 and 511 to X-counter 516. The X-coordinate on conductor 38-X, while the carton is being loaded on the pallet, is incremented by the value 2L and the third carton is loaded in position 246-113 of the odd-level diagram of FIG. 3A.

This process continues with successive cartons being loaded in adjacent positions. It is necessary to cease loading in the first row before the length of the row exceeds the maximum permissible value.

There are actually two tests which are performed to determine when no more cartons should be loaded in any row. One test is to verify that the loading of another carton will not exceed the maximum dimension of the pallet in the X-direction. This dimension is stored in pallet X-register 525. The register should be set by an operator in accordance with the size of the pallet being used in any loading operation. The second test (done at the same time) is to verify that the loading of another carton will not overhang the end of the next-lower or supporting level of cartons in the X-direction by more than a predetermined extent. In the illustrative embodiment of the invention, it is assumed that as long as two-thirds of a carton has support, the carton will not fall and the stack and will be stable. (A larger fraction of the carton length could be used, or a smaller fraction, or an arbitrary distance of overhang could be used in essentially the same way.) Consequently, the length of each level in the X-direction is registered, and before each carton is loaded on the next upper level a test is performed to verify that the carton will not overhang the previous level in the X-direction by more than one-third of its size. The length in the X-direction of the previous level is stored in previous X-dimension register 509. At the end of the loading of the last row in any level, the length of the row is stored in register 509 for use in connection with loading of the next level. With respect to the first row, of course, there is no "previous X-dimension." For this reason, before the first level is loaded, the maximum pallet dimension in the X-direction is stored in register 509. Thus, when the first level is being loaded, the two tests in the X-direction are really the same. The output of the pallet X-dimension register 525 is extended to the information input of AND-gate 533. The control input to gate 533 is coupled to conductor 542. The PIP pulse on conductor 542 after the first pallet is put in place allows the pallet X-dimension in register 525 to be transmitted through gate 533 and OR-gate 534 into "previous X-dimension" register 509.

When loading cartons in a row in an odd level, the X-counter contains the X-coordinate of the left side of the last-loaded carton, as seen in FIG. 3A. To determine whether the loading of another carton in the same row will exceed the maximum dimension of the pallet in the X-direction, the dimension L is added to the contents of the X-counter and the sum is compared to the maximum dimension of the pallet. The dimension L (stored in register 501) is coupled to an input of AND-gate 514. The other input to this AND-gate is connected to conductor 539 which is extended to the 0 output of flip-flop 615 and is energized during odd-level loading. Consequently, the contents of register 501 appear at the output of gate 514, and are transmitted to one input of summer 518. The output of X-counter 516 is connected to the input of summer 518. The output of the summer is connected to one input of pallet X-comparator 520. The other input to the comparator is derived from the output of pallet X-dimension register 525. If the output of summer 518, which is what the length of the row would be if another carton were added to it, exceeds the value stored in register 525, the output of the comparator is energized and a pulse is transmitted through OR-gate 522. The output of this gate, when energized, is an indication that the loading of the row is completed and the loading of another row should begin.

The following provides the test for automatic assurance that at least two-thirds of one more carton will be supported by the level under it, if that carton is added to the row being loaded. This is the equivalent of determining whether the length of the row will exceed the length of the supporting level in the X-direction (underneath the level being loaded) by one-third of the length of the carton. The length of the carton being loaded, contained in register 501, is extended to the input of divider 504. The output of the divider is one-third of the length and it is extended to an input of each of AND-gates 505 and 506. The control conductor for gate 506 is connected to conductor 536 which is deenergized by flip-flop 615 during odd-level loading. The control conductor of gate 505, however, is connected to conductor 539 which is energized during odd-level loading. Thus, gate 505 operates and one-third of the dimension L is extended through gate 505 and OR gate 507 to one input of summer 508. The other input of the summer is connected to the output of register 509 which contains the length in the X-direction of the previous level. (As mentioned above, during the loading of the first level, this entire test is not necessary because register 509 is initially given a value equal to the maximum length of the pallet in the X-direction, and as a result of the first test—no loading beyond the outline of the pallet—the ⅓ overhang test is not controlling. The pallet X-dimension is stored in register 509 during loading of the first level since otherwise the ⅓ overhang test would be based on a zero-length row at this time and even one carton would theoretically overhang too far. However, the present description is applicable to all odd levels.) The output of summer 508 is thus equal to the length in the X-direction of the previous level plus one-third of the length of a carton. The output of the summer is extended to one input of previous X-comparator 526.

The other input of the comparator is connected to the output of summer 518 and thus represents the length of the row if the next carton is loaded in it. As long as this length does not exceed the output of summer 508, comparator 526 does not operate. However, if the length does exceed the maximum permissible value, comparator 526 operates and energizes the other input of OR-gate 522. Again, the energization of the output of this OR-gate is an indication that the loading of the present row should terminate and the loading of another row should begin, subject to Y-direction tests to be described. With the operation of OR-gate 522, the pulse is extended to one input of OR-GATE 515 to clear X-counter 516, and thereby to eliminate the corresponding input to summer 518, in order to load the first carton in the next row.

With the operation of the OR-gate 522, the length of the just-completed row of cartons is transmitted to "Previous X-Dimension" register 509. For this purpose, the output of gate 522 is also extended to the control terminal of gate 524. Conductor 539, which is energized by flip-flop 615 during odd-level loading, is connected to the control input of gate 519. The information input to this gate is connected to the output of X-counter 516. The contents of the X-counter are thus transmitted through gate 519 and OR gate 523 to the other input of gate 524. As soon as OR gate 522 operates, the completed length of the row of cartons as represented by the contents of the X-counter is transmitted through gate 524 and OR-gate 534 to the input of previous X-dimension register 509. (While a pulse from gate 522 clears the X-counter, the value last available in the information channel 519-523 is present long enough to be entered in register 509. In other words, the output pulse from gate 522 and the clearing operation inherently involve sufficient delay for this action to occur. Otherwise a short delay could be introduced into the "clear" line from gates 22 to OR-gate 515.) In this way, the length of the row in the X-direction is stored in register 509. Actually, it is apparent that, at the end of the loading of every row in every level, the length of the row is stored in register 509. But the length of every row in any given level is the same since it has been assumed here that all the cartons being loaded on any one pallet are of the same size. Consequently, the fact that register 509 receives an entry at the end of the loading of every row is but one mode of operation. The important fact is that at the end of the loading of the last row in any level, the length of the row is stored in register 509 to control the loading of the cartons in the X-direction in the next upper level.

The output of gate 522 is also extended through delay 527 and OR gate 513 to an input of AND-gate 512. However, as described above, this gate is not enabled during odd-level loading because one of its inputs is connected to conductor 536 which is energized only during even-level loading.

The output of OR-gate 522 is extended over conductor 535 to one input of each of gates 610 and 611. One input of gate 610 is connected to conductor 536, and consequently this gate does not operate during odd-level loading. One control input of gate 611 is connected to conductor 539, and this gate is enabled by flip-flop 615 during odd-level loading when the pulse is generated on conductor 535 and applied to another control input of gate 611. The third or information input of gate 611 is coupled to the output of Y-register 601. Consequently, at the end of the loading of any row in an odd level, the number stored in the Y-register, dimension W of the carton, is extended through gate 611 and OR-gate 612 to the input of Y-counter 614. Prior to the loading of the first row in any level, including the first, the Y-counter is cleared by a PIP pulse on line 542 from pallet advance mechanism 710. Following the loading of the first row in any odd level, the Y-counter is incremented by dimension W. The carton which has already been gripped, and which has resulted in the generation of a pulse on conductor 535 in the first place, is now loaded onto the pallet in accordance with an X-counter value of zero and a Y-counter value of W. The carton is thus placed in position 246-121 in the odd-level diagram of FIG. 3A because the program coordinate in the Y-direction is modified in summer 616 by dimension W.

The second row is loaded in the same way as the first in any odd level, except that the Y-coordinate during the loading is W rather than O. Following the loading of the second row, OR gate 522 operates once again and Y-counter 614 is incremented to a value of 2W. The third row is thus loaded as required. This process continues but it is necessary to insure that the loading of the pallet in the Y-direction does not exceed a maximum value. Again, two tests are performed. First, if another row of the cartons being loaded would exceed the Y-dimension of the pallet, a new level is begun. Second, if another row of cartons would result in any carton overhanging the previous level of cartons in the Y-direction by more than one-third of the width of the carton, a new level is begun. As for the second test when the first level is being operated upon, since there is no previous level of loaded cartons, the maximum Y-dimension which is in control is the Y-dimension of the pallet. The test circuitry for the Y-direction is very similar to that for the X-direction.

Pallet Y-register 621 contains the dimension of the pallet in the Y-direction and can be set by the operator in accordance with the Y-dimension of the pallet being used. The output of the register is extended to one input of pallet Y-comparator 624. The output of the Y-counter 614 is extended to one input of summer 617. It must be recalled that the Y-counter represents the Y-coordinate of edge 258 of any carton, which is the same as the present length of the level in the Y-direction. Summer 617 forms the length in the Y-direction if another row is added. The output of Y-register 601 is extended to one input of AND-gate 619, the other input to which is coupled to conductor 539 which is energized during odd-level loading by flip-flop 615. Thus, the dimension W stored in register 601 is extended through gate 619 and OR-gate 618 to the second input of summer 617. The output of the summer represents what the length in the Y-direction will be if another row is loaded. If this length exceeds the maximum dimension of the pallet in the Y-direction, the output of comparator 624 is energized to energize output conductor 628 through OR-gate 623.

Previous Y-dimension register 607 is provided as part of the "overhang" test in the Y-direction. This register ordinarily contains the length in the Y-direction of the last complete level of loaded cartons. During the loading of the first level, the dimension of the pallet is entered in this register so that the "overhang" test is not in effect when there is no previous loaded level of cartons. The output of register 621 is extended to an input of gate 626, the other input to which is coupled to conductor 542. Consequently, when the PIP pulse on conductor 542 is generated at the beginning of the entire sequence, the dimension of the pallet in the Y-direction is extended through gate 627 to the input of register 607. As will be described below, at the end of the loading of any level, the length of the level in the Y-direction is stored in register 607, and it is this dimension which is used in the second test to determine whether or not one more row should be added in any level. But during loading of the first level, the Y-dimension of the pallet is used instead. In effect, this is a way of disabling the "overhang" test during the loading of the first level of cartons on a pallet.

The output of Y-register 601 is extended through divider 604 to the information input of each of gates 605 and 606. The control input of gate 606 is connected to conductor 536 which is deenergized during odd-level loading. The control input of gate 605 is connected to conductor 539 which is energized by flip-flop 615 during odd-level loading. Consequently, gate 605 operates during odd-level loading and extends through OR-gate 609 to enter the value W/3 into one input of summer 608. Since the other input to summer 608 is connected to register 607, the output of summer 608 technically represents the Y-dimension of the pallet plus W/3 during loading of the first level of cartons and thereafter it represents the dimension of the previous level of loaded cartons in the Y-direction plus one-third of dimension W of the carton. The output of summer 608 is extended to one input of previous Y-comparator 622. The other input to this comparator comes from the output of summer 617 representing the length of the level in the Y-direction if one more row of cartons were added. As long as the length of the level will not exceed the output of summer 608, the output of comparator 622 is not energized. But if another row would cause the dimension in the Y-direction of the level of cartons being loaded to exceed the maximum allowable, the output of comparator 622 is energized and a pulse is extended through OR-gate 623 to energize conductor 628. The energization of conductor 628 is an indication that the loading in the particular level has been completed.

It is necessary to store in register 607 the dimension of the level in the Y-direction. Conductor 628 is connected to the control input of gate 625. The information input of gate 625 is connected to the output of Y-counter 614 which represents the length of the loaded level of cartons in the Y-direction at any time. This value is extended through gate 625 and OR-gate 627 and entered into register 607 where it is stored for use during the loading of the next level.

The output of OR-gate 623 is also extended to an input of OR-gate 613 which clears Y-counter 614. This clearing operation inherently is slower than the entry of the Y-counter output into register 607 or, if not, a delay may be added. Prior to the loading of the next level, it is necessary to clear the Y-counter so that the first row loaded in that level will not have its Y-coordinate modified.

At the end of the loading of the first or any other level, the pulse at the output of OR-gate 623 is also extended to the input of flip-flop 615. At the end of the loading of an odd level, the pulse causes the flip-flop to switch to the 1 state in which condition output 1 is energized. This switching of the flip-flop controls the loading of the even level in accordance with the even-level loading pattern of FIG. 3.

The output of OR-gate 623 is extended over conductor 628 to the control input of gate 704. It will be recalled that, prior to the loading of the first level, the height of the carton being operated upon was stored in Z-counter 706. This provides the Z-coordinate for the carton-delivering point of transfer head 212 during loading of the first level of cartons on the pallet. At the end of the loading of the first level, or any other level, counter 706 is incremented by the value of the height dimension H of the carton. Thus, the cartons loaded in the next level will be delivered by transfer head 212 to a level H above the last level, and 2H above the pallet. The information input to gate 704 is connected to the output of Z-register 701 which contains the value H. Consequently, at the end of the loading of any level when conductor 628 is energized, the contents of the Z-register are extended through gate 704 and OR-gate 705 to the Z-counter. With the Z-counter incremented in this fashion, the Z-coordinate on conductor 38–Z is modified by summer 707 to control the lowering of head 212 to the proper Z-coordinate for the loading of the next level.

When a carton is transferred from the bin and lowered to the pallet during the loading of an even level, as is apparent from the even-level loading pattern of FIG. 3B and as described in detail above, each carton is rotated 90° in the clockwise direction. This is controlled by the energization of conductor 44 connected between the 1 output of flip-flop 615 and the robot of FIG. 4. The control system of FIGS. 5—7 has provisions for this mode of operation. A control signal on line 44 has the effect of rotating head 212, but only in those parts of the carton-transfer program for which the slots provide head-indexing control recordings in the "function control" part of the drum, closing gate 33a so as to transmit the signal on line 44.

As has been described above, the Y-coordinate in counter 614 that modifies the point-of-delivery Y-coordinate of transfer head 212 is incremented following the loading of each row. This is part of the loading control system for even levels just as in the case of the loading routine for odd levels. However, for even levels the Y-coordinate must now be incremented by the value L, rather than the value W. At the end of the loading of any row in an even level, it is the value stored in X-register 501 which is used to increment Y-counter 614.

Similarly (as was described previously) after each carton is loaded in any even level, the X-coordinate must be incremented to modify the X-coordinate of head 212 when it is at the pallet, so that each carton will be deposited next to the last-loaded carton of that row. However, in loading even levels, the value W is used as the increment in the X-direction rather than the value L. Accordingly, the X-counter 516 is incremented by the value stored in Y-register 601. Gates 510, 512, 610 and 612 are labeled "L" and "W," to indicate their roles in transmitting the length or the width to X-counter 516 and Y-counter 614.

Furthermore, while in the loading of an odd level, the X-counter is not incremented until after the first carton in each row is loaded, this is not true in the case of an even level. As discussed above in connection with the loading sequence in FIG. 3B (during which each carton is rotated 90°), the X-coordinate supplied by drum 10 should be modified prior to the loading of the first carton to avoid loading the first carton at the side of the pallet. Incrementing of the X-counter is initiated by the output pulse from OR-gate 522 extended to delay 527. It should be noted that whenever OR-gate 623 operates to indicate the end of the loading of a level, it must have been preceded by the operation of OR-gate 522 which indicated the end of the loading of a row since, during the loading of even levels, it is the energization of the output of OR-gate 522 which controls the incrementing of Y-counter 614 in the first place. During odd-level loading, the pulse extended through delay 527 and OR gate 513 to one input of gate 512 at the end of the loading of each row has no effect because gate 512 has one input connected to deenergized conductor 536. However, as soon as flip-flop 615 changes state, conductor 536 is energized. Delay 527 sufficiently delays the pulse from OR-gate 512 to allow it to energize gate 512 after conductor 536 has been energized. Consequently, at this time, the output of Y-register 601 is extended over cable 538 through gate 512 and OR-gate 511 to X-counter 516. The X-counter is initially cleared by the pulse at the output of OR-gate 522. Following the delay introduced by element 527, the value W in Y-register 601 is entered into X-counter 516. Thus, the first carton in the first row of each even level is properly placed. Furthermore, the first carton in every row of each even level is properly placed because OR-gate 522 operates following the loading of every row to control the entry of the value W into X-counter 516 before the next row is started.

Following the loading of the first carton on any even level, and the gripping of the next carton in the bin, a pulse is generated on conductor 543 by differentiator 532. During the loading of an odd level, this pulse is extended to an input of gate 510 and controls the incrementation of X-counter 516 by the value L stored in X-register 501. But in the case of even-level loading, the input of gate 510 connected to conductor 539 is deenergized. Although gate 512 does not operate with the generation of each pulse on conductor 543 during odd-level loading, it does operate during even-level loading because the input connected to conductor 536 is now energized. Each pulse on conductor 543 results in the transmission of the value W stored in Y-register 601 through gate 512 and OR-gate 511 to X-counter 516 to increment the counter. Thus, successive cartons are loaded in the first row (and in each succeeding row) of each even level with their edges 258 at successive X-coordinates differing by the value W.

The same two basic tests as are involved in odd-level loading must also be performed to determine when each row in an even level has been completed. During odd-level loading, X-counter 516 is incremented immediately after each carton is first gripped in the bin. The same is true in even-level loading, except that in even-level loading the X-counter is also incremented prior to the loading of the first carton. Thus, immediately after each carton is gripped and the X-counter is incremented, the X-counter represents what the length of the row would be in the X-direction (that is, the X-coordinate of corner 258 of the carton just gripped) if the carton just gripped were loaded. This is due to the fact that the even-level loading is such that corner 258 of the carton, whose X-coordinate for the loading of the carton just gripped is represented in the X-counter, is on the right side of each carton in the even-level loading pattern of FIG. 3B, rather than on the left side of each carton as in the odd-level loading pattern. Thus, after any carton is gripped and the X-counter is incremented, the value in the counter exceeds the actual length of the row at that time by the value of the last increment, that is, the value W. The output of X-counter 516 is extended to an input of summer 518. The other input to the summer is connected to the output of gate 514. It will be recalled that during odd-level loading this gate operates to extend the value L from X-register 501 to summer 518 in order to determine what the length of the row in the X-direction will be if the carton just gripped is loaded on the row being worked on. During even-level loading, the equivalent operation would be to add the value W in register 601 to the contents of X-counter 516, but there is no need to do this since the value in X-counter 516 actually represents what the length of the row will be if the new carton is loaded in it. At this time, gate 514 is blocked, and therefore the output of the summer is the same as the value in counter 516. This value is applied to one input of pallet X-comparator 520. As in the case of odd-level loading, the comparator determines whether the length of the row, if another carton were to be loaded, would exceed the X-dimension of the pallet. If that is indicated, the output of the comparator is energized to energize one input of OR-gate 522. When the output of the OR-gate is energized, it is an indication that a new row must be started.

The length-of-row overhang test during even-level loading is similar to that performed during odd-level loading, except that the overhang test now involves dimension W, rather than dimension L. The output of summer 518 is extended to one input of previous X-comparator 526. The other input to this comparator is derived just as it is during odd-level loading, except that one-third of the value W is added to the contents in previous X-dimension register 509, rather than one-third of the value L stored in X-register 501. During odd-level loading, conductor 539 is energized and gate 505 controls the transmission of the value L/3 through OR-gate 507 to one input of summer 508. During even-level loading, conductor 539 is deenergized and gate 505 does not operate. However, the control input of AND-gate 606 is connected to the 1 output of flip-flop 615 which is energized at this time. The output of divider 604 is extended through gate 606, over conductor 540, and through OR-gate 507 to one input of summer 508. The summer adds the value W/3 to the value in register 509 and applies the sum to the second input of previous X-comparator 526. If the new carton, were it added to the row, would overhang the previous level in the X-direction by more than one-third of its dimension W, the output of comparator 526 energizes the second input of OR-gate 522.

To determine the actual length of a row at any given time during loading of even levels, it is necessary to subtract the value W from the contents of the X-counter. This value (actual length of row) is needed for entry into previous dimension X-register 509. The output of X-counter 516 is connected to the plus input of subtractor 517. The output of Y-register 601 is connected over cable 538 to the minus input of the subtractor. Since the Y-register contains the value W, the output of subtractor 517 represents the present length of each row in the X-direction in an even level after a carton is gripped in the bin. The output of the subtractor is extended to an input of gate 521. The other input of gate 521 is connected to conductor 536 which is energized during even-level loading. The output of gate 521 is extended through OR-gate 523 to an input of gate 524. The other input to gate 524 is connected to the output of OR-gate 522 which is energized at the end of the loading of each row in any level. When gate 524 operates, the output of subtractor 517 is extended through OR-gate 534 to the input of previous X-dimension register 509. Thus, during even-level loading, as well as odd-level loading, the length of each row is entered into register 509. (All rows of any one level are necessarily of the same length since the same size carton is used here throughout the loading of any pallet.)

The pulse at the output of OR-gate 522 is extended through OR-gate 515 to clear X-counter 516. As in the case of the loading of the first row of an even level, the value W is entered in the X-counter (immediately after it is cleared) in readiness for each succeeding row to be loaded in an even level. The pulse at the output of OR-gate 522 is extended through delay 527 and OR-gate 513 to an input of gate 512. Just as this gate operated prior to the loading of the first carton in the first row of this even level, it operates prior to the loading of the first carton in any row of an even level so that the initial value stored in X-counter 516 is W.

In preparation for loading the second and each succeeding row of an even level, the pulse at the output of OR-gate 522 is extended over conductor 535 to control inputs of both AND-gates 610 and 611. Gate 611 does not operate, however, because conductor 539, connected to one of its inputs, is deenergized during even-level loading. Gate 610 does operate since one of its inputs is connected to conductor 536 which is energized during even-level loading. Since the third input of gate 610 is connected over cable 537 to the output of X-register 501, the value L stored in this register is transmitted through gate 610 and OR-gate 612 to Y-counter 614.

Thus, after the first row in any even level is loaded, the Y-counter is incremented by the value L. As may be seen from the even-level loading pattern of FIG. 3B, this value L is the proper value. Successive rows are loaded in each even level in the same manner as the first.

The two tests to determine the end of the loading in the Y-direction for an even level are basically the same as those performed during the loading of an odd level. In both even- and odd-level loading, the Y-counter represents the present length of the level in the Y-direction. To determine what the length would be if another row were to be loaded, the value L is added to the contents of Y-counter 614. The output of this counter is extended to one input of summer 617. While gate 619 operates during odd-level loading since one of its control inputs is connected to conductor 539, during even-level loading gate 620 operates since one of its control inputs is connected to energized conductor 536. The other input of gate 620 is connected by cable 537 to the output of X-register 501 and the value L is extended through gate 620 and OR-gate 618 to the other input of summer 617. The output of this summer is extended to one input of pallet Y-comparator 624 which compares what the length of the level would be in the Y-direction, if one more row were to be loaded, to the pallet dimension in the Y-direction. If another row would result in a level having a Y-dimension which exceeds the pallet dimension in the Y-direction, the output of comparator 624 is energized to energize conductor 628 through OR-gate 623. This is an indication that another level must be begun.

As for the second test, the output of summer 617 is extended to one input of previous Y-comparator 622. The previous Y-dimension stored in register 607 is once again extended to one input of summer 608. While in odd-level loading, the value L/3 is to be entered into the summer, during even-level loading the value W/3 is to be entered. During even-level loading, gate 506 operates because one of its inputs is extended to energized conductor 536. The other input to gate 506 is connected to the output of divider 504 in order that the value L/3 be extended over cable 541 and through OR-gate 609 to one input of summer 608. The test is very similar to that performed during odd-level loading, and if previous Y-comparator 622 operates, OR-gate 623 energizes conductor 628.

With the energization of conductor 628 as a result of the operation of either of comparators 622 and 624, the length of the level in the Y-direction is stored in previous Y-dimension register 607 for use in connection with the tests during the loading of the next level. Conductor 628 is connected to one input of gate 625. The other input to the gate is connected directly to the output of Y-counter 614 which represents the length of any level in the Y-direction. Gate 625 operates and the value stored in Y-counter 614 is extended through OR-gate 627 to register 607.

After the loading of any level it is necessary to change the state of flip-flop 615. The pulse on conductor 628 is extended to the input of the flip-flop. After loading of the even layer is complete, the flip-flop switches to the 0 state. A pulse from gate 623 on completion of an odd level switches the flip-flop to its 1 state. The pulse is also extended through one input of OR-gate 613 to clear the Y-counter prior to the loading of the next level.

It should be noted that, with the switching of the flip-flop to the 0 state, conductor 536 is deenergized before the pulse from OR-gate 522 is transmitted through delay 527. Consequently, gate 512 does not operate and X-counter 516 remains cleared. This is the desired effect. The next level to be loaded is odd, and during odd-level loading the first carton is lowered on the pallet with no entry in the X-counter 516.

The pulse on conductor 628 is also extended to one input of gate 704. Just as the value in Z-counter 706 is incremented by the value H stored in register 701 following the loading of each odd level, so the value in the counter is incremented following the loading of each even level.

It is necessary to determine that the loading of another level will not result in a height which exceeds the maximum permissible value. This value is stored in pallet Z register 709 whose output is extended to one input of pallet Z-comparator 708. The output of Z-counter 706 is extended to the other input of the comparator. The output of the L-counter, after it is incremented, represents what the height of the load would be if another level were loaded. If it exceeds the maximum permissible height, comparator 708 operates and extends a pulse through OR-gate 713 to signal the requirement that an empty pallet should replace the full one, or to initiate operation of pallet advance mechanism 710 which causes the loaded pallet to be removed and another empty pallet to move into its place. A pulse from comparator 708 also energizes stop conductor 42 which causes robot movement to cease. The carton in the bin which has just been gripped by the robot remains there until the stop signal on conductor 42 terminates. When the new pallet is in place, conductor 42 deenergizes and a pulse is applied to PIP pulse conductor 542. All registers and counters are cleared, and the new pallet is loaded just as was the previous one.

EMBODIMENT OF FIGS. 9 AND 10

The apparatus of FIG. 9 is very similar to that of FIG. 2. Corresponding parts in FIG. 9 bear the same numerals as in FIG. 2. The major difference relates to the position of shaft 230 relative to head 212, and the operation of the four grippers 214, 216, 218 and 220.

Shaft 230 is mounted along the central axis of head 212, rather than at one of its corners as in FIG. 2. Instead of grippers 214 and 218 being fixed relative to head 212 as in FIG. 2, they move in the embodiment of FIG. 9. Gripper 214 is attached to shaft 913 which is moved within cylinder 912 by an actuator in head 212. Gripper 218 is mounted to shaft 916 which is moved within cylinder 917 by an actuator in head 212. The actuators are such that shafts 226 and 916 move equally but in opposite directions, shaft 230 remaining midway between them. Similar remarks apply to grippers 214 and 216. Grippers 214 and 218 are here provided with sensors 914 and 915, which are similar to sensors 252 and 254. Four sensors could similarly be used in FIG. 2. Further, other forms of sensors are readily substituted. For example, hydraulic or pneumatic cylinders used as actuators can be used for operating the grippers and supplied with fluid under pressure via a constriction in the fluid supply line; and then a pressure sensor coupled to the cylinder would show a buildup of pressure above a threshold, indicating that the grippers have seized the carton. The form of sensor used is not of controlling importance here.

The article handling apparatus of FIG. 9 can be operated under control of the system in FIGS. 4—7, with a limited amount of change. Conductor 40—G1 is energized only when both of sensors 914 and 254 are operated. Similarly, conductor 40—G2 is energized only when sensors 252 and 915 are both operated.

The basic program for lifting a carton from the bin and loading it on the pallet is the same with the use of the article handling apparatus of FIG. 9 as it is with the use of the article handling apparatus of FIG. 2, except in one respect. With the use of the apparatus of FIG. 2, in order to pick up a carton shaft 230 is lowered until sensor 250 is operated and then grippers 216 and 220 move in until the carton is gripped. With the article handling apparatus of FIG. 9, the grippers are first extended to their maximum opening. Shaft 230 is then lowered until sensor 250 is operated. All four grippers are then moved in until the carton is secured between all of them and all four sensors have operated. The carton may be moved in the X- and Y-directions in the bin as the four grippers engage respective sides of the cartons in any sequence. When all four grippers firmly grip the carton, conductor 40—G1 and 40—G2 are energized to indicate that the robot should advance to the next step to transfer the carton to the pallet.

In an effective carton-transfer sequence, the program is recorded such that the axis of shaft 230 corresponds to the 0,0 coordinates of the pallet. If each carton were loaded in accordance with the patterns of FIGS. 3A and 3B, but with the same coincidence of program coordinates O,O and pallet coordinates 0,0, it is apparent that the first row of cartons in any odd-level would extend beyond edge 266 of the pallet by the value W/2, and the first row of cartons in any even level would extend beyond the same edge of the pallet by the value L/2. Similarly, it is apparent that in odd levels the first carton in each row would extend beyond the edge 264 by the value L/2, and the first carton in each row of every even level would extend beyond the edge of the pallet by the value W/2. For this reason, in order for the same basic program to result in proper pallet loading with the article handling apparatus of FIG. 9, the value of the X-coordinate transmitted to the X-actuator is incremented by the value L/2 during odd-level loading, while at the same time incrementing the value of the Y-coordinate transmitted to the Y-actuator by the value W/2. Conversely, during even-level loading the X-coordinate is incremented by the value W/2 and the Y-coordinate is incremented by the value L/2.

FIG. 10 shows the modifications in the circuit of FIGS. 4—7 that is effective for this purpose. Referring to FIG. 5, it will be recalled that terminals X1 and X2 in box 528 were described as being connected directly to each other when the article handling apparatus of FIG. 2 is used. Similar remarks apply to terminals Y1 and Y2 in box 530. The same is not true when the circuit is used together with the article handling apparatus of FIG. 9. Referring to FIG. 10, it will be seen that summer 581 is connected between terminals X1 and X2, and summer 582 is connected between terminal Y1 and Y2. Summer 581 causes the value L/2 to be added to the X-coordinate transmitted over cable 38—X during odd-level loading, and the value W/2 to be added to the X-coordinate during even-level loading. Summer 582 causes the value W/2 to be added to the Y-coordainte during even-level loading.

The PIP pulse generated by pallet advance mechanism 710 after each new pallet is in place is extended to one input of each of gates 571 and 574 on FIG. 10. Cable 41—G1 which is extended from FIG. 4 to FIG. 5 is also extended to FIG. 10. Similar remarks apply to cable 41—G2. With the article handling apparatus of FIG. 9, the encoder output on cable 41—G1 represents the instantaneous distance between grippers 214 and 216. Similarly, the encoder output on cable 41—G2 represents the instantaneous distance between grippers 218 and 220. Divider 570 halves the value L on cable 41—G1 and with the generation of the PIP pulse the value L/2 is extended through gate 571 to X/2 register 572. Similarly, divider 573 controls the storage of the value W/2 in Y/2 register 575.

Odd-level conductor 584 is connected to the O output of odd-even flip-flop 615, and this conductor is energized during odd-level loading. Consequently, during odd-level loading the control input of each of AND-gates 576 and 578 is energized. The information input of gate 576 is extended to the output of register 572. Thus, during odd-level loading the value L/2 is extended through gate 576 and OR-gate 580 to the second input of summer 581. The information input of gate 578 is connected to the output of register 575. Thus, during odd-level loading the value W/2 is extended through gate 578 and OR-gate 583 to the second input of summer 582.

The converse is true during even-level loading. At this time conductor 585 is energized rather than conductor 584, and the control input of each of AND-gates 577 and 579 is energized. The output of register 575 is extended to the other input of gate 577, and thus during even-level loading the value W/2 is extended through gate 577 and OR-gate 580 to the second input of summer 581. The output of register 572 is extended to the second input of gate 579, and thus during even-level loading the value L/2 is extended through gate 579 and OR-gate 583 to the second input of summer 582. Thus, at the same time that the circuit of FIGS. 5—7 results in the modification of the X- and Y-coordinate information on cables 38—X and 38—Y the circuit of FIG. 10 further modifies this coordinate information to control proper pallet loading.

It should be noted that with the arrangement of FIGS. 9 and 10, it is not necessary to increment X-counter 615 by the value W prior to the loading of the first carton on any row in an even level, as was necessary in the first embodiment of the invention (see even-level pattern of FIG. 3). This is due to the fact that the central axis of head 212 does not initially correspond to a corner of the pallet after incrementation of the X- and Y-counters by W/2 and L/2. The circuit of FIG. 5 is easily modified to prevent the undesired incrementation. Delay 527 in FIG. 5 is merely omitted, with the output of OR-gate 522 being extended directly to an input of OR-gate 513. As described above, it is delay unit 527 which controls the incrementation in the first place, so if the delay is omitted the incrementation does not take place. The clearing of counter 516 by the output of gate 515 takes longer than the time between the operations of gates 522 and 511 without delay unit 527 in the circuit; X-counter 516 is not incremented initially at the beginning of the loading of any row.

The article handling apparatus of FIG. 9 may be more desirable in some situations than that of FIG. 2 because the entire load (assuming a constant density carton) is along the axis of shaft 230. In the apparatus of FIG. 2, the central axis of the carton is not coincident with the axis of shaft 230 and the article handling apparatus of FIG. 9 is especially advantageous when heavy cartons are being loaded. For the proper operation of the apparatus of FIG. 9 with the same basic robot program and the same circuitry of FIGS. 5—7, however, it is necessary to include the additional circuitry of FIG. 10.

The first and second illustrative embodiments of the invention have been described with reference to pallet loading in which case the coordinates used in the execution of the basic recorded bin-to-pallet program are modified for the end of the program, when each carton is loaded on the pallet. But the converse is also possible: the invention is also applicable to the unloading of a pallet in which case the robot picks up cartons at different locations on a pallet and deposits them all at the same position, on a conveyor belt, for example. In this case, the basic robot program is modified by the external circuit at the beginning of each basic program rather than at its end.

After a pallet has been loaded with cartons of a given size, it can be unloaded under control of a recorded program containing the whole sequence of X-, Y-, Z-coordinates that were actually used in loading that pallet with those cartons. A simple and direct way to accomplish this is to record in sequence all of the actual operations that were carried out in loading the pallet, including the actual X-, Y- and Z-coordinates used. The recordings can be entered in any suitable medium, for transfer into any drum or other program of this or another robot that is later to control an article-transfer head in an unloading sequence. This recording operation is achieved by any suitable recorder 1,000 (FIG. 4) having inputs (not shown) from the encoders 17 and from appropriate parts of the function control reader of drum 10. Better, the actual coordinates of each of the cartons as they are loaded can be recorded, to be used in a pallet-unloading operation in the manner that is described in U.S. Pat. No. 3,306,471. There a basic article transfer program is executed repeatedly and at one point in the program there is a shift to the next-available set of X-, Y- and Z-coordiantes defining the carton locations of a pallet.

Either of the foregoing programs can be recorded during the loading of a pallet with cartons, and the recording can be shipped with that pallet for use by a robot at the destination. The described apparatus serves in this sense as an automatic means for generating a program.

The executed program stored in recorder 1,000 may be used in still another way, to advantage. After the program has been generated using the control apparatus of FIGS. 4—7 inclusive, the program can then be transcribed into drum 10 by coupling a tape reader to write circuits 27. Thereafter that recorded program can be used for repeating the loading of standardized pallets with cartons of the same size. It follows that the program generating portions of FIGS. 4—7 that involve registers, summers, comparators and the like can all be contained in a separable unit, a rudimentary computer, and that unit can be removed from the robot illustrated and plugged into another robot of the same design for automatically generating in that robot a suitable program for loading pallets with cartons in the described manner.

Although the invention has been described with reference to particular embodiments, numerous modifications may be made therein and other arrangements may be devised without departing from the spirit and scope of the invention.

What we claim is:

1. Apparatus for transferring articles to a receiving area including an article transfer mechanism having an article holder, means for operating the article holder through desired paths in space, control means including means for storing a program for controlling said operating means to execute repeatedly a basic sequence of operations which includes seizing an article at a pickup location, transferring the article to a particular location in the receiving area, releasing the article, and returning the article holder to a pickup location, first means for providing control information representing the extent of assigned space to be allocated to the articles to be placed in the receiving area in relation to each other, second means for providing control information representing the extent of the receiving area, and means responsive to both of said control information providing means for modifying the control by that part of said stored program that relates to motions of the article holder at the receiving area in successive program cycles to transfer successive articles automatically to successive parts of the receiving area as limited by said second information representing means.

2. Article transfer apparatus in accordance with claim 1, wherein said first control information providing means includes means providing control representations of the transverse dimensions of the articles to be deposited and wherein the second control information providing means includes means providing control representations of the transverse dimensions of an article receiving area, and wherein said modifying means includes first and second summers and first and second means for comparing the output of the summers to the representations of the transverse dimensions of the article receiving area for causing the article transfer mechanism to form rows of articles, each row containing a number of articles limited by the dimensions of the articles along the row and by the corresponding dimension of the receiving area, the number of rows being limited by the dimensions of the articles transverse to the rows and by the corresponding dimension of the receiving area.

3. Article transfer apparatus in accordance with claim 2, wherein said second control information providing means includes means for storing the maximum representations of said first and second summers during operation of the apparatus to form one layer of articles to provide control information for limiting the length and the number of rows in a layer of articles to be deposited on the previously deposited layer.

4. Article transfer apparatus in accordance with claim 2, wherein said modifying means includes means providing representations of portions of the transverse dimensions of an article by which the article is to be allowed to overhang beyond the dimensions of the receiving area, and means for combining the output of said last-named means with the information supplied to said first and second comparing means.

5. Article transfer apparatus in accordance with claim 1, wherein said first control information providing means includes a caliper operable under control of said program storing means to provide control output representing a dimension of an article to be transferred, and wherein said modifying means includes means for receiving said control output of the caliper and arranged to sum-up the dimension representations of successive articles for causing the article transfer mechanism to form a row of articles, said modifying means including a comparer responsive to said summing means and to said second control information providing means for preventing the addition of an article to a row that would be excessively long in comparison to the corresponding dimension of the receiving area.

6. Article transfer apparatus in accordance with claim 1, wherein said first control information providing means includes calipers operable under control of the program storage means to provide control output representing the transverse dimensions of an article to be transferred, and wherein said modifying means includes a first summer to receive control output from one of said calipers and arranged to accumulate the corresponding dimensions of successive articles for controlling the placement of the articles in a row, and said modifying means including a second summer to receive control output from the other of said calipers for controlling the lateral placement of rows of articles.

7. Article transfer apparatus in accordance with claim 6, wherein said modifying means includes first and second comparers responsive, respectively, to said first and second summers and to said second control information providing means for causing the article transfer means to start a new row whenever another article when added to a row being formed would make the row excessively long and for preventing a row from being added in excess of the extent of rows that should be accumulated in the receiving area.

8. Article transfer apparatus in accordance with claim 2 wherein said program storage means includes means for indexing certain of the articles during transfer thereof to said receiving area for achieving more stable loading, and control means coordinated with said indexing means for interchanging the information representing the transverse dimensions of the articles as that information is supplied to said first and second summers.

9. Apparatus for transferring articles to a receiving area in accordance with claim 1, further including means for storing each of the modified control representations for subsequent use in lieu of said modifying means in controlling the same or another apparatus to load or unload a pallet according to the same placement of articles thereon.

10. Apparatus in accordance with claim 7 wherein said program storing means contains representations of the end-points of each said operation in the form of digital coordinates and wherein the information from said calipers and from said second information supplying means is supplied to the comparers in the form of digital codes representing the lengths and widths of the articles and of the receiving area.

11. Apparatus for transferring articles to a receiving area including an article transfer mechanism having an article holder, means for operating the article holder through desired paths in space, control means including means for storing a program for controlling said operating means to execute repeatedly a basic sequence of operations which includes seizing an article at a pickup location, transferring the article to a particular location in the receiving area, releasing the article, and returning the article holder to a pickup location, said article holder having article-calipering means operable against an article to be transferred to the receiving location, and means responsive to said calipering means for modifying the control of the operating means by that part of said stored program that relates to the motions of the article holder at the receiving area in successive program cycles to transfer successive articles automatically to successive positions in said receiving area, said calipering means including two pairs of jaws operable symmetrically toward a common center for making mutually perpendicular measurements of the length and width of an article to be transferred, said apparatus including means responsive to the calipering means for deriving halves of said measurements, said modifying means being responsive to said half-measurement deriving means for transferring the article of the first basic sequence of operations to a location in said receiving area displaced in mutually perpendicular directions from said particular location by said halves of said calipered measurements, said modifying means additionally including means responsive to the whole of each of said measurements for depositing said articles in successive rows in the receiving area, said apparatus including means in control of said modifying means for determining the ending of any given row and for initiating another row.

12. Apparatus for transferring articles to a receiving area including an article transfer mechanism having an article holder, means for operating the article holder through desired paths in space, control means including means for storing a program for controlling said operating means to execute repeatedly a basic sequence of operations which includes seizing an article at a pickup location, transferring the article to a particular location in the receiving area, releasing the article, and returning the article holder to a pickup location, said article holder having article-calipering means operable against an article to be transferred to the receiving location, and means responsive to said calipering means for modifying the control of the operating means by that part of said stored program that relates to the motions of the article holder at the receiving area in successive program cycles to transfer successive articles automatically to successive positions in said receiving area, said calipering means including parts for making measurements of the length and width of an article to be transferred, and said modifying means including portions responsive to both measurements of said calipering means for depositing said articles in successive rows in the receiving area, said apparatus including means for determining the ending of any given row and for initiating another row.

13. Article transfer apparatus in accordance with claim 12, wherein said apparatus includes further control means for causing articles delivered to the receiving area to be deposited in successive layers, said means for controlling the apparatus to execute a basic sequence of operations including means to cause 90°-rotation of the article holder between the pickup location and the receiving area in depositing alternate layers of articles, said modifying means being arranged to cause successive articles deposited in one layer to be distributed in successive rows in accordance with the calipered length and width of the articles, respectively, said modifying means being responsive to said further control means to cause successive articles to be deposited in another layer to be distributed in successive rows in accordance with the calipered width and length of the articles, respectively, said apparatus including means in control of said modifying means for ending any given layer and for initiating a succeeding layer.

14. Article transfer apparatus in accordance with claim 12, wherein said program storing means provides digital signals representing the coordinates of said particular location, wherein said calipering means is adapted to provide digital signals representing the calipered dimensions of the articles to be transferred, and wherein said modifying means includes a first summer for combining one digital rectangular coordinate of said particular location with the calipered digital lengths of the sequence of articles deposited in rows and a second summer for combining another digital rectangular coordinate of said particular location with the calipered digital widths of the sequence of articles for locating successive rows.

15. Article transfer apparatus in accordance with claim 14, wherein said apparatus includes further control means for causing the articles deposited in said receiving area to be deposited in successive layers, said means for controlling the apparatus to execute a basic sequence of operations including means to cause 90°-rotation of the article holder between the pickup location and the receiving area in depositing alternate layers of articles, said modifying means being operative to cause deposition of articles in a first layer as aforesaid and being responsive to said further control means during deposition of the articles in the second layer for causing the first summer to combine said one digital coordinate of said particular location with the calipered digital widths of the sequence of articles deposited in rows and for causing the second summer to combine said other digital coordinate of said particular location with the calipered digital lengths of the sequence of articles deposited in successive rows, said apparatus including means in control of said modifying means for ending any given layer and for initiating a succeeding layer.

16. Apparatus for transferring articles to a receiving area including an article transfer mechanism having an article holder, means for operating the article holder through desired paths in space, control means including means for storing a program for controlling said operating means to execute repeatedly a basic sequence of operations which includes seizing an article at a pickup location, transferring the article to a particular location in the receiving area, releasing the article, and returning the article holder to a pickup location, said article holder having article-calipering means operable against an article to be transfered to the receiving location, and means responsive to said calipering means for modifying the control of the operating means by that part of said stored program that relates to the motions of the article holder at the receiving area in successive program cycles to transfer successive articles automatically to successive positions in said receiving area, said calipering means including two pairs of jaws operable symmetrically toward a common center for making mutually perpendicular measurements of the length and width of an article to be transferred, said apparatus including means responsive to the calipering means for deriving halves of said measurements, said modifying means being responsive to said half-measurement deriving means for transferring the article of the first basic sequence of operations to a location in said receiving area displaced in mutually perpendicular directions from said particular location by said halves of said calipered measurements, said article holder being rotatable about a vertical axis through said center, said apparatus including further control means for causing the articles deposited in said receiving area to be deposited in successive layers, said means for controlling the apparatus to execute a basic sequence of operations including means to cause 90 -rotation of the article holder about said axis between the pickup location and the receiving area in depositing alternate layers of articles, said modifying means including portions responsive to said length and width measurements, respectively, for causing the article holder to deposit the articles in successive rows in accordance with said length and width measurements, respectively, in a first layer, and said apparatus having means for altering said modifying means to cause deposition of the articles in successive rows in the next layer parallel to the rows of the previous layer in response to said width and length measurements, respectively, said apparatus including means in control of said modifying means for ending any given layer and for initiating a succeeding layer.